(12) United States Patent
Aasen

(10) Patent No.: US 9,658,700 B2
(45) Date of Patent: May 23, 2017

(54) EXTERNAL KEYBOARD

(75) Inventor: Torbjorn Aasen, Nesttun (NO)

(73) Assignee: ONE2TOUCH AS, Bergen (NO)

(*) Notice: Subject to any disclaimer, the term of this patent is extended or adjusted under 35 U.S.C. 154(b) by 1169 days.

(21) Appl. No.: 12/278,136

(22) PCT Filed: Feb. 2, 2007

(86) PCT No.: PCT/NO2007/000035
§ 371 (c)(1),
(2), (4) Date: Aug. 28, 2008

(87) PCT Pub. No.: WO2007/089158
PCT Pub. Date: Aug. 9, 2007

(65) Prior Publication Data
US 2009/0033627 A1 Feb. 5, 2009

(30) Foreign Application Priority Data

Feb. 3, 2006 (NO) .................................... 20060570
Jun. 7, 2006 (NO) .................................... 20062610

(51) Int. Cl.
*G06F 3/02* (2006.01)
*H01H 13/86* (2006.01)

(52) U.S. Cl.
CPC ........... *G06F 3/0221* (2013.01); *H01H 13/86* (2013.01); *H01H 2223/052* (2013.01)

(58) Field of Classification Search
CPC . G06F 3/0221; H01H 13/86; H01H 2223/052

(Continued)

(56) References Cited

U.S. PATENT DOCUMENTS 4,827,155 A * 5/1989 Firebaugh .................. 307/141.4
5,220,521 A * 6/1993 Kikinis .......................... 708/138

(Continued)

FOREIGN PATENT DOCUMENTS

WO    WO 00/36849        6/2000
WO    WO 01/88683 A1    11/2001

*Primary Examiner* — Amit Chatly
(74) *Attorney, Agent, or Firm* — McDermott Will & Emery LLP

(57) ABSTRACT

There is described a keyboard including user-operable alpha-numeric keys. One or more identification devices associated with the user-operable keys are included in the keyboard. When placed in proximity to the keyboard, the one or more identification devices selectively communicate with a digital apparatus in response to user-actuation of the user-operable keys. The keyboard comprises a flexible substrate for enabling the keyboard to be folded into a non-deployed inactive state, and unfolded into a deployed active state for communicating with the digital apparatus. When in proximity thereto, the keyboard communicates with the apparatus by way of near-field magnetic and/or electrostatic coupling. The keyboard includes an intermediate resonant circuit for interfacing between the one or more identification devices and the digital apparatus; the resonant circuit includes a component spatially disposed to overlay a first region onto the digital apparatus in use, and to overlay a second region coupled to the one or more identification devices in use for coupling signals therebetween. The keyboard is especially useful for mobile telephones and personal digital assistants (PDAs) for rendering data entry easier.

39 Claims, 20 Drawing Sheets

(58) Field of Classification Search
USPC .................................................. 345/168, 169
See application file for complete search history.

(56) References Cited

U.S. PATENT DOCUMENTS

| | | | |
|---|---|---|---|
| 5,493,654 A * | 2/1996 | Gopher et al. ................... | 341/22 |
| 5,748,114 A | 5/1998 | Koehn | |
| 6,133,833 A | 10/2000 | Sidlauskas et al. | |
| 7,027,039 B1 * | 4/2006 | Henty ........................... | 345/173 |
| 7,367,943 B2 * | 5/2008 | Schluter ........................ | 600/438 |
| 2002/0044096 A1 * | 4/2002 | Chung .......................... | 343/742 |
| 2003/0146902 A1 * | 8/2003 | Sandbach et al. ............. | 345/168 |
| 2004/0061683 A1 * | 4/2004 | Mochizuki et al. .......... | 345/168 |
| 2006/0114129 A1 * | 6/2006 | Henty ........................... | 341/22 |

\* cited by examiner

EXTERNAL KEYBOARD

RELATED APPLICATIONS

This application is the U.S. National Phase under 35 U.S.C. §371 of International Application No. PCT/NO2007/000035, filed on Feb. 2, 2007, which in turn claims the benefit of Norwegian Application Nos. 20060570 and 20062610, filed on Feb. 3 and Jun. 7, 2006, respectively, the disclosures of which Applications are incorporated by reference herein.

FIELD OF THE INVENTION

The present invention relates to external keyboards, for example to external keyboards operable to interface to digital apparatus spatially positioned in near proximity thereto. Moreover, the invention also relates to methods of communicating information from such external keyboards to their associated apparatus in near proximity thereto. Furthermore, the present invention also relates to software products executable on the digital apparatus for enabling the apparatus to communicate with such external keyboards. Additionally, the invention relates to digital systems including digital apparatus operable to be coupled to external keyboards.

BACKGROUND OF THE INVENTION

Contemporary digital apparatus include, for example, cell phones, mobile telephones, digital personal organizers, and personal data assistants (PDAs). An example of a mobile telephone in illustrated in FIGS. 1 and 2, the mobile telephone being indicated generally by 10. The telephone 10 includes a display screen 20, for example implemented using liquid crystal display (LCD) technology, for displaying information such as text and images to a user of the telephone 10. Moreover, the telephone 10 further includes a keyboard indicated generally by 30 for inputting data into the telephone 10, for example numerical data for dialing and text for special messaging service (SMS). Other component parts of the telephone include a microphone 40 and a loudspeaker 50 coupled to a data processor 60. Moreover, the telephone 10 also includes an antenna 70 coupled to radio frequency circuits 80 coupled in turn to the data processor 60 of the telephone 10 for enabling the telephone 10 to communicate by wireless to a mobile telephone network (not shown); such communication to the mobile telephone network is implemented at a radio communication frequency in an order of 1 GHz. Optionally, the telephone 10 is also capable of communicating directly via a wireless interface 90 coupled to the data processor 60 with other devices in close spatial proximity to the telephone 10, for example in a range of a few meters by way of proprietary Blue Tooth or similar protocol, namely at a radio communication frequency of 13.56 MHz. Such other devices include, for example, an earphone and microphone headset enabling "hands-of" operation of the telephone 10.

Personal data assistants (PDAs) are generally similar to the mobile telephone 10 described in the foregoing, except that components for enabling the PDAs to communicate with a mobile telephone network are omitted. However, it is conventional practice that PDAs are operable to communicate locally thereto in a wireless manner, for example by using a Blue Tooth protocol, to other digital apparatus, for example personal computers (PCs) and lap-top computers, for example for data synchronization purposes.

Digital apparatus such as mobile telephones and personal data assistants are becoming progressively more complex with time as manufacturers include more powerful data processors and more memory therein. Moreover, such apparatus has now attained a sufficient degree of sophistication that software applications, for example written in Java or Java script, can be downloaded thereto for performing special functions which can be optionally executed in response to users' commands. For example, some mobile telephones include text editing software to assist with preparation of SMS messages which can be stored in data memory included within the telephones.

In order to provide mobile telephone products and personal data assistant products which are desirable to contemporary users, manufacturers of such products have sought to produce progressively more compact digital apparatus. A consequence of such miniaturization is that the aforementioned keyboard 30 has evolved by one or more of: including more user depressible keys, employing keys of smaller physical size, employing multifunction keys. Moreover, a further consequence of such miniaturization is that the aforementioned display screen 20 is of increased pixel resolution for presenting finer detail. Such evolution of the keyboard 30 and the display 20 results in problems for users with diminished eyesight and lack of finger nimbleness experiencing difficulty when working with contemporary digital apparatus such as mobile telephones and personal data assistants. In order to address such problems, it is contemporary practice to provide users with a pointed stylus for depressing miniature keys and also with optical magnifies, for example magnifying lenses for observing miniature displays. Moreover, multifunction keys are susceptible to reducing a total number of keys require but renders user data entry laborious unless users have superlative finger nimbleness.

In the foregoing, local digital communication via Blue Tooth or similar protocol is described. Other classes of devices employing such protocol include radio frequency identification devices (RFID). Near-field communication (NFC) is also known. NFC technology is based on a combination of contactless identification technology akin to RFID and various connection technologies. Standards have become established which define how devices employing such technologies can inter-operate to form peer-to-peer (P2P) networks. NFC operates in a frequency range in an order of 13.56 MHz over a distance of typically a few centimeters. Moreover, efforts have been hitherto applied to standardize NFC-technology; such standards include ISO 18092, ISO 21481, ECMA (340, 352 and 356) and ETSI TS 102 190. Furthermore, such NFC-technology is also compatible with contactless infrastructure for smartcards based on a standard ISO 14443 A, including Philips' MIFARE-technology and Sony's FeliCa-card.

In a published international PCT application no. PCT/US99/29362 (WO 00/36849), there is described a hand held passive remote programmer for a microprocessor-controlled induction-type radio frequency identification (RFID) reader. The reader includes a rigid molded housing including an antenna denoted by a capacitor C1 and an inductor L1, together with a plurality of dedicated integrated-circuit RFID transponder tags IC1 to IC16. Each transponder tag has an unique code associated therewith. Moreover, the housing also includes a keypad having a plurality of keys. Each key is selectively operable to connect directly a corresponding one of the transponder tags to the antenna for providing power to the selected tag by induction in a radio frequency sensitive field of a RFID reader. The RFID reader is thereby capable of determining in operation when one or more of the keys are depressed by a user of the remote programmer. Program instructions stored in the RFID reader recognize each unique tag as representative of actuation of a particular key on the remote programmer keypad. Actuation of particular keys or key sequences of the programmer are recognized by the RFID reader as program instructions for the reader's microprocessor.

Other remote wireless keyboards are known. For example, in a published U.S. Pat. No. 6,133,833, there is described a wireless keyboard or keypad which is powered remotely by a radio frequency exciter/receiver. The wireless keyboard is adapted for use in a radio frequency identification system. Moreover, the wireless keyboard and the exciter/receiver communicate without wires via electrostatic or electromagnetic radiation. No power source is integrated with the wireless keypad. It is alleged that the wireless keypad is readily added to, or retrofitted into, an existing radio frequency identification system. The keyboard has a plurality of keys or control members that are manually actuated. Depression of a key or button causes a predetermined response signal associated with that key or button to be generated. The response signal relates to an operation for a device or system associated with the exciter/receiver. Implementation of the wireless keyboard involves coupling an antenna comprising an inductor and a capacitor directly to an array of RFID devices which are selectively connected to the antenna in response to keys or buttons being user-actuated.

Such wireless keyboard and passive remote controller as described in the foregoing are of relatively larger physical size in comparison to a mobile telephone or personal data assistant, such larger size representing a technical problem. Moreover, such keyboard and controller are often implemented such that a mobile telephone or personal data assistant (PDA) would not be capable of coupling sufficiently well to provide power to the keyboard or passive controller.

SUMMARY OF THE INVENTION

A first object of the invention is to provide a wireless keyboard capable of operating with mobile telephones and/or personal data assistants and similar types of miniature digital apparatus.

A second object of the invention is to provide a wireless keyboard which is compact when stored but is operable to assume a sufficiently large size when deployed to facilitate easier data entry by users.

A third object of the invention is to provide a wireless keyboard whose design renders it capable of interoperating with a plurality of different types of mobile telephones and personal data assistants.

One or more of these objects of the invention are capable of being addressed by the present invention as defined by the accompanying claims.

According to a first aspect of the invention, there is provided a keyboard including a plurality of user-operable alpha-numeric keys, the keyboard including one or more identification devices associated with the user-operable keys, and wherein the one or more identification devices are operable to selectively communicate with a digital apparatus placed in proximity of the keyboard in response to user-actuation of one or more of the user-operable keys, characterized in that:

(a) the keyboard comprises a flexible substrate for enabling the keyboard to be folded and/or rolled into a non-deployed inactive state, and unfolded and/or unrolled into a deployed active state for communicating with the digital apparatus;

(b) the keyboard is operable to communicate with the digital apparatus when in proximity thereto by way of near-field magnetic and/or electrostatic coupling; and (c) the keyboard includes an intermediate resonant circuit for interfacing between the one or more identification devices and the digital apparatus, wherein the resonant circuit includes a component which is spatially disposed to overlay a first region onto the digital apparatus in use, and to overlay a second region coupled to the one or more identification devices in use for coupling signals therebetween.

The invention is of advantage in that a combination of the keyboard being flexible, employing near-field communication and being efficiently coupled via an intermediate resonant circuit renders the keyboard of benefit when performing data entry into the digital apparatus.

Optionally, in the keyboard, the intermediate resonant circuit is operable to exhibit a Q-factor greater than unity for providing signal enhancement for enabling the one or more identification devices to be energized from power delivered through the intermediate resonant circuit thereto. Such a high Q-factor provides for more energy efficient communication between the digital apparatus and the keyboard, thereby enabling, for example, the keyboard to be energized from the digital apparatus, thereby avoiding a need to include a battery or similar within the keyboard. More optionally, the Q-factor is beneficially in a range of 10 to 100.

Optionally, in the keyboard, the intermediate resonant circuit is only coupled for communicating alternating signals induced therein to the one or more identification devices and to the digital apparatus. Circumvention for a need to make a physical electrical connection between the keyboard and the digital apparatus renders the keyboard easier to couple promptly into communication with the digital apparatus, and also renders the keyboard more reliable in operation, especially in damp and/or corrosive environments.

Optionally, the substrate of the keyboard comprises a plurality of layers bonded, laminated and/or molded together. Such a manufacturing approach renders the keyboard conveniently manufactured using automated production equipment. More optionally, the keyboard is fabricated by the plurality of layers being bonded, laminated and/or molded together in roll-good form during manufacture of the keyboard.

Optionally, in the keyboard, the plurality of layers includes at least one of: polymeric insulating layers, electrically conductive layers, printed electronic polymer layers, surface mounted electronic chip components, surface mounted passive components.

Optionally, to render the keyboard even more useful in combination with the digital apparatus when such digital apparatus is of diminutive form, the keyboard further includes a pixel display with an associated display driver for receiving in operation data from the digital apparatus via the intermediate resonant circuit for presenting visual information to a user of the keyboard when in operation. More optionally, for example for economy and ease of production, the pixel display is implemented using organic printable electronic components which are operable to flex when the keyboard is manipulated between its inactive folded state and its active unfolded state.

Optionally, in the keyboard, the first region is smaller in area than the second region. Such a ratio renders the intermediate resonant circuit of the keyboard less prone to becoming detuned in use in response to various types of digital apparatus being used in conjunction with the keyboard.

Optionally, in the keyboard, the first region is arranged to have an area corresponding substantially to an area provided on the keyboard for receiving the digital apparatus in operation. Such a disposition of the keyboard is operable to couple more strongly to the digital apparatus when placed in proximity of the keyboard when deployed in its active unfolded state.

Optionally, for example to comply with various international standards for RFID integrated circuits, in the keyboard, the intermediate resonant circuit is operable in operation to exhibit a resonant frequency of substantially 13.56 MHz.

Optionally, in the keyboard, at least one of the one or more identification devices is operable to multiplex a plurality of keys of the keyboard for monitoring user-actuation thereof during operation of the keyboard. Such multiplexing is susceptible to reducing a number of identification devices needing to be assembled into the keyboard during its manufacture, thereby potentially reducing its manufacturing cost.

Optionally, for ease of use for enabling both left- and right-hands to be used for data entry to the keyboard, the first region for receiving the digital apparatus is disposed substantially centrally in the keyboard when deployed in its active unfolded state.

Optionally, alternatively, the first region of the keyboard is disposed substantially asymmetrically towards a peripheral edge of the keyboard when deployed in its active unfolded state.

Optionally, the keyboard has its keys selectively spatially disposed to assist with one or more of: alpha-numerical data entry to the digital apparatus, playing games executed in communication with the digital apparatus. Such disposition of the keyboard is capable of rendering it optimally adapted for users to perform specific types of data entry into the digital apparatus.

Optionally, the keyboard includes a source of power therein, the source of power being coupled in operation to energize the one or more identification devices in an event that insufficient power is couplable from the digital apparatus via the intermediate resonant circuit to energize the one or more identification devices. Such an implementation of the keyboard is capable of rendering the keyboard useable with a greater range of digital apparatus, some of which potentially do not radiate with sufficient power to energize the keyboard.

According to a second aspect of the invention, there is provided a keyboard including a plurality of user-operable alpha-numeric keys, the keyboard including one or more identification devices associated with the user-operable keys, and wherein the one or more identification devices are operable to selectively communicate with a digital apparatus placed in proximity of the keyboard in response to user-actuation of one or more of the user operable keys, characterized in that:

(a) the keyboard comprises a flexible substrate for enabling the keyboard to be folded and/or rolled into a non-deployed inactive state, and unfolded and/or unrolled into a deployed active state for communicating with the digital apparatus;

(b) the keyboard is operable to communicate with the digital apparatus when in proximity thereto by way of near-field magnetic and/or electrostatic coupling; and (c) the keyboard further includes a pixel display with an associated display driver for receiving in operation data from the digital apparatus for presenting visual information to a user of the keyboard when in operation.

Optionally, the keyboard includes an intermediate resonant circuit for interfacing between the one or more identification devices and/or the display driver to the digital apparatus.

A keyboard pursuant to the second aspect of the invention is implemented such that the pixel display is implemented using organic printable electronic components which are operable to flex when the keyboard is manipulated between its inactive folded state and its active unfolded state.

According to a third aspect of the invention, there is provided a method of coupling a keyboard including a plurality of user-operable alpha-numeric keys in communication with a digital apparatus placed in proximity of the keyboard, the keyboard including one or more identification devices associated with the user-operable keys, the one or more identification devices being operable to selectively communicate with the digital apparatus in response to user-actuation of one or more of the user operable keys, characterized in that the method includes steps of:

(a) manufacturing the keyboard to comprise a flexible substrate for enabling the keyboard to be folded and/or rolled into a non-deployed inactive state, and unfolded and/or unrolled into a deployed active state for communicating with the digital apparatus;

(b) communicating from the keyboard with the digital apparatus when in proximity thereto by way of near-field magnetic and/or electrostatic coupling; and (c) utilizing in the keyboard an intermediate resonant circuit for interfacing between the one or more identification devices and the digital apparatus, wherein the resonant circuit includes a component which is spatially disposed to overlay a first region onto the digital apparatus in use, and to overlay a second region coupled to the one or more identification devices in use for coupling signals therebetween.

According to a fourth aspect of the invention, there is provided a software product stored and/or conveyed on a data carrier, the software product being executable on computing hardware of a digital apparatus for use in implementing a method pursuant to the third aspect of the invention. The software product is susceptible to be conveyed to the digital apparatus via a signal operable to function as a data carrier and/or via a physical data carrier.

It will be appreciated that features of the invention are susceptible to being combined in any combination without departing from the scope of the invention as defined by the appended claims.

DESCRIPTION OF THE DIAGRAMS

Embodiments of the invention will now be described, by way of example only, with reference to the following diagrams wherein.

Figure 3:
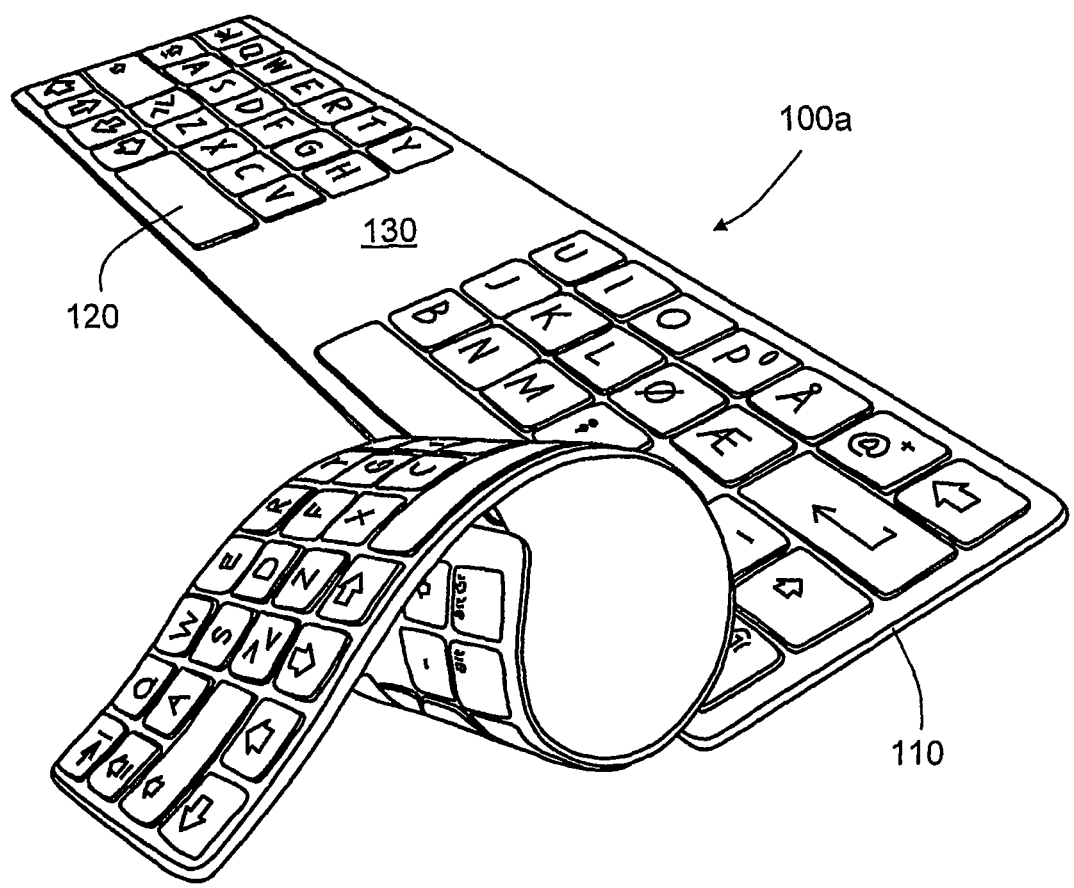
FIG. 3 is a schematic diagram of a first embodiment of the invention, namely an external keyboard implemented using a flexible substrate.
Figure 16A:
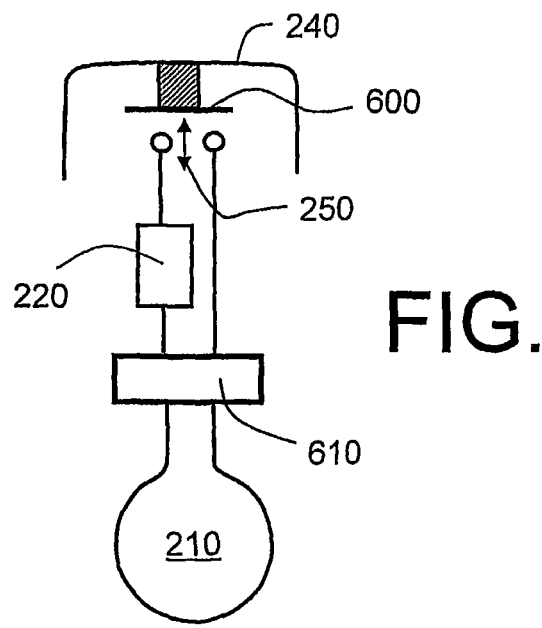
Figure 16B:
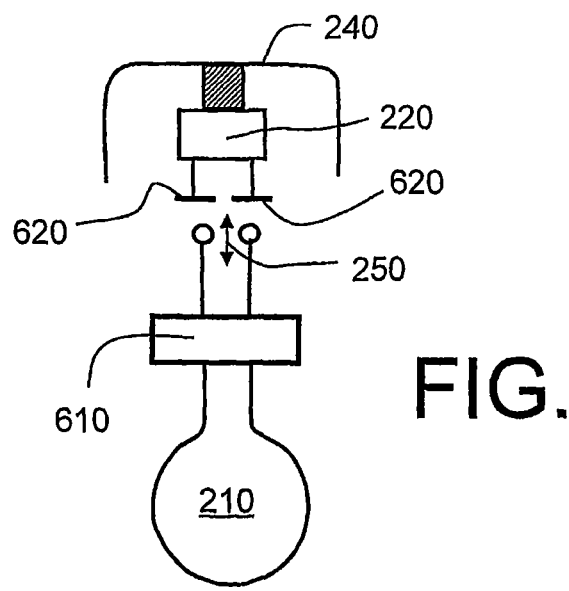
Figure 16C:
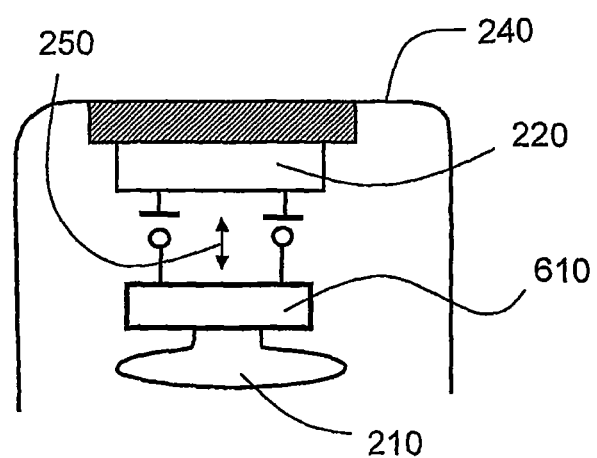
Figure 17A:
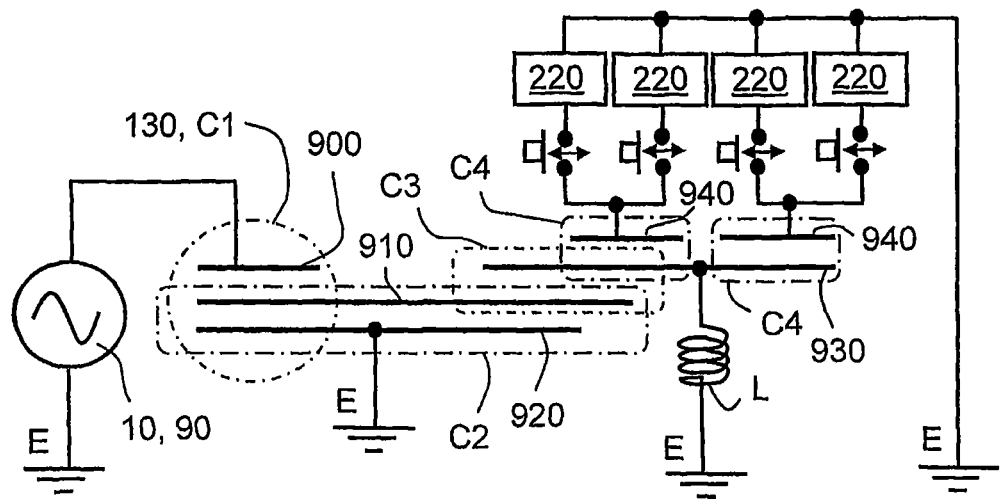
Figure 17B:
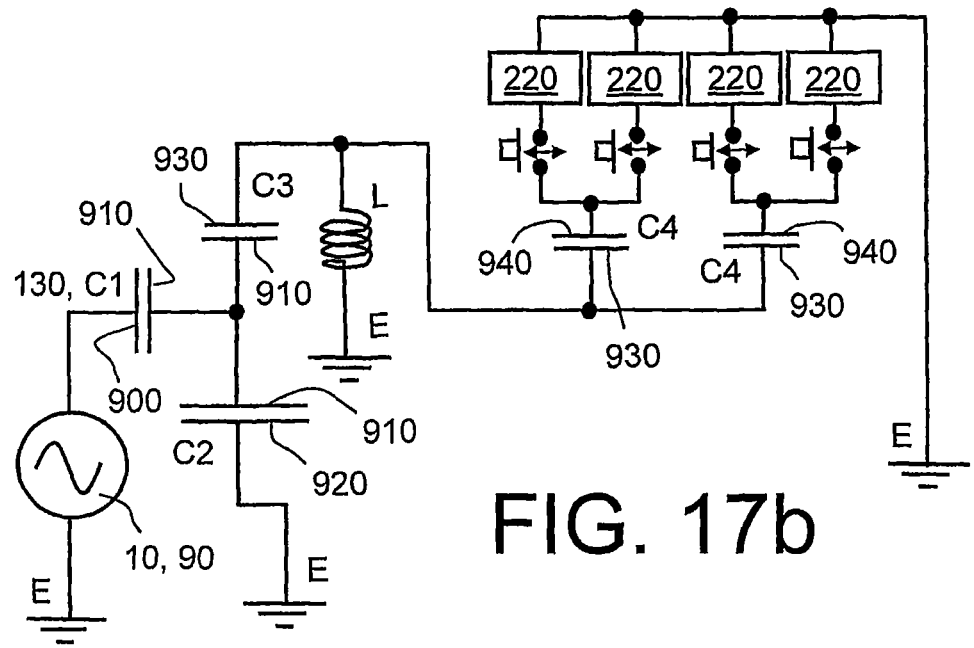
Figure 18:
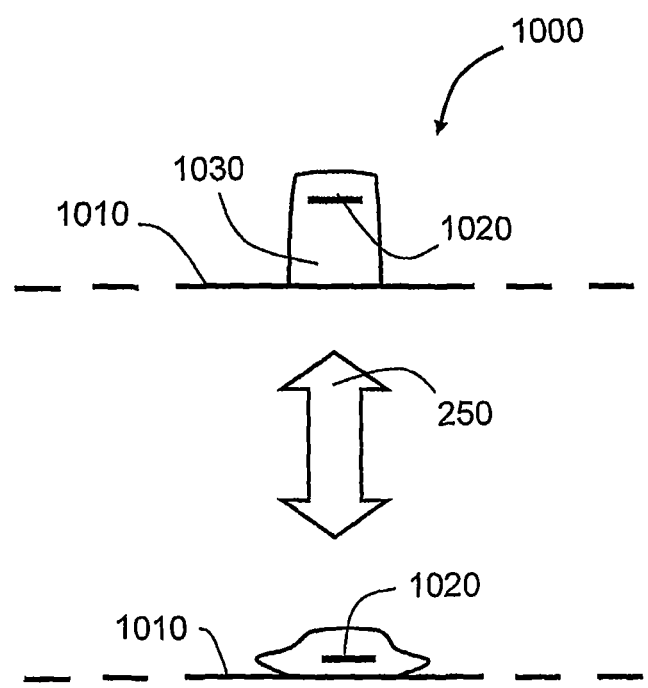

FIGS. 16*a*, 16*b*, 16*c* are illustration of various alternative connection arrangements for coupling radio frequency identification device (RFID) integrated circuits in the keyboard of FIG. 3 and variants thereof shown in other of the diagrams;

FIGS. 17*a* and 17*b* are schematic illustrations of an implementation of the external keyboard shown in FIG. 3 implemented using electrostatic capacitive coupling therein when in operation; and FIG. 18 is a schematic illustration of a capacitively coupled switch suitable for use when implementing the external keyboard shown in FIG. 3 using electrostatic capacitive coupling.

In the accompanying diagrams, a number accompanied by an associated arrow is used to generally indicate a given item. Moreover, an underlined number is employed to denote an item onto which it is overlaid. A number associated with a connecting line is used to denote an item at which an end of the connecting line remote from the number terminates.

DESCRIPTION OF EMBODIMENTS OF THE INVENTION

In overview, the present invention is concerned with an external keyboard which can be interoperated with compact digital apparatus by way of near-field wireless communication; such compact digital apparatus includes one or more of mobile telephones, personal data assistants (PDAs) and such like, although optionally not limited thereto. On account of its flexible construction, the external keyboard in its first inactive state is susceptible to being folded or rolled-up when not in use. Moreover, the external keyboard is susceptible to being unfolded or unrolled to its second active state to deploy it for use. Furthermore, optionally, the external keyboard includes an area thereof designated for placement of the compact digital apparatus thereupon, thereby enhancing efficient coupling of near-field radiation from the compact digital apparatus to the remote keyboard and vice versa.

Referring to FIG. 3, illustrations of an embodiment of an external keyboard pursuant to the present invention are indicated generally by 100*a*. The external keyboard 100*a* is fabricated to include a flexible substrate 110. The substrate 110 is capable of being at least one of folded and rolled for storage when not in use. Alternatively, when being deployed, the external keyboard 100*a* is capable of being unfolded or unrolled as appropriate to a substantially planar state onto a substantially planar bearing surface, for example onto an upper surface of a table, for enabling user access to actuate keys, for example a key 120, of the keyboard 100*a*. Such deployment of the keyboard 100*a* to substantially planar state is also illustrated in FIG. 4 wherein a region 130 is arranged to receive the compact digital apparatus, for example a mobile telephone or a personal digital assistant (PDA), denoted by 10.

Figure 4:
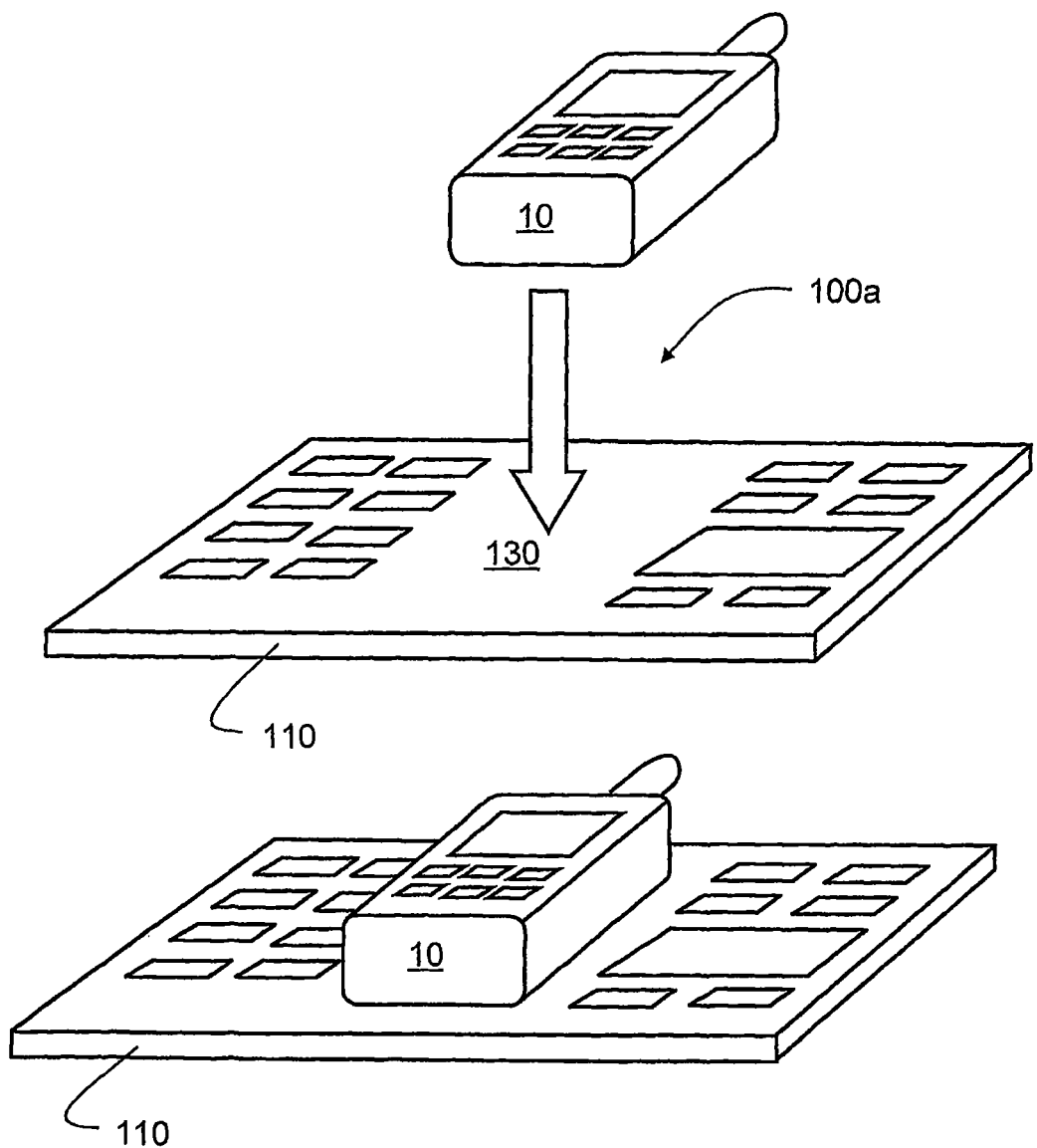
FIG. 4 is an illustration of placement of the mobile telephone of FIG. 1 onto the external keyboard as shown in FIG. 3.

The keyboard 100*a* illustrated in FIGS. 3 and 4 optionally has a thickness to its substrate 110 in a range of 2 mm to 5 mm, and optionally planar dimensions when deployed comprising a left-to-right length in a range of 15 cm to 30 cm and a front-to-back depth in a range of 10 cm to 20 cm. However, the keyboard 100*a* can be implemented to have other physical sizes as will be elucidated later. Moreover, although the region 130 for receiving the mobile telephone 10 is illustrated in FIGS. 3 and 4 as being substantially towards a centre of the keyboard 100*a*, it will be appreciated in other implementations of the keyboard include the region 130 offset to one side thereof.

The substrate 110 of the keyboard 100*a* is preferably fabricated from flexible materials, for example from one or more of: silicone rubber, plastics material film, plastics material film with metallic conductors included thereon or therein, plastics material film with electronic components printed and/or bonded thereonto and so forth. Optionally, the plastics material film is fabricated from polyimide Kapton, acetate sheet or similar; "Kapton" is a registered trade mark of Du Pont Inc. Moreover, the substrate 110 optionally further comprises surface-mounted electronic components such as ceramic capacitors, resistors and RFID integrated circuits. Conveniently, the RFID integrated circuits are of contemporary design and are operable to conform to aforementioned standards for RFID devices. The substrate 110 can be formed by molding, bonding and/or laminating techniques; for example, various sheets of plastics material and/or silicone can be laminated, bonded and/or molded together on a continuous basis and then subsequently cut to from individual keyboards 100*a*. Such a continuous approach to manufacture in so-called "roll-good" form is capable of rendering the keyboard 100a rapidly mass-producible in automated manufacturing equipment.

Figure 5:
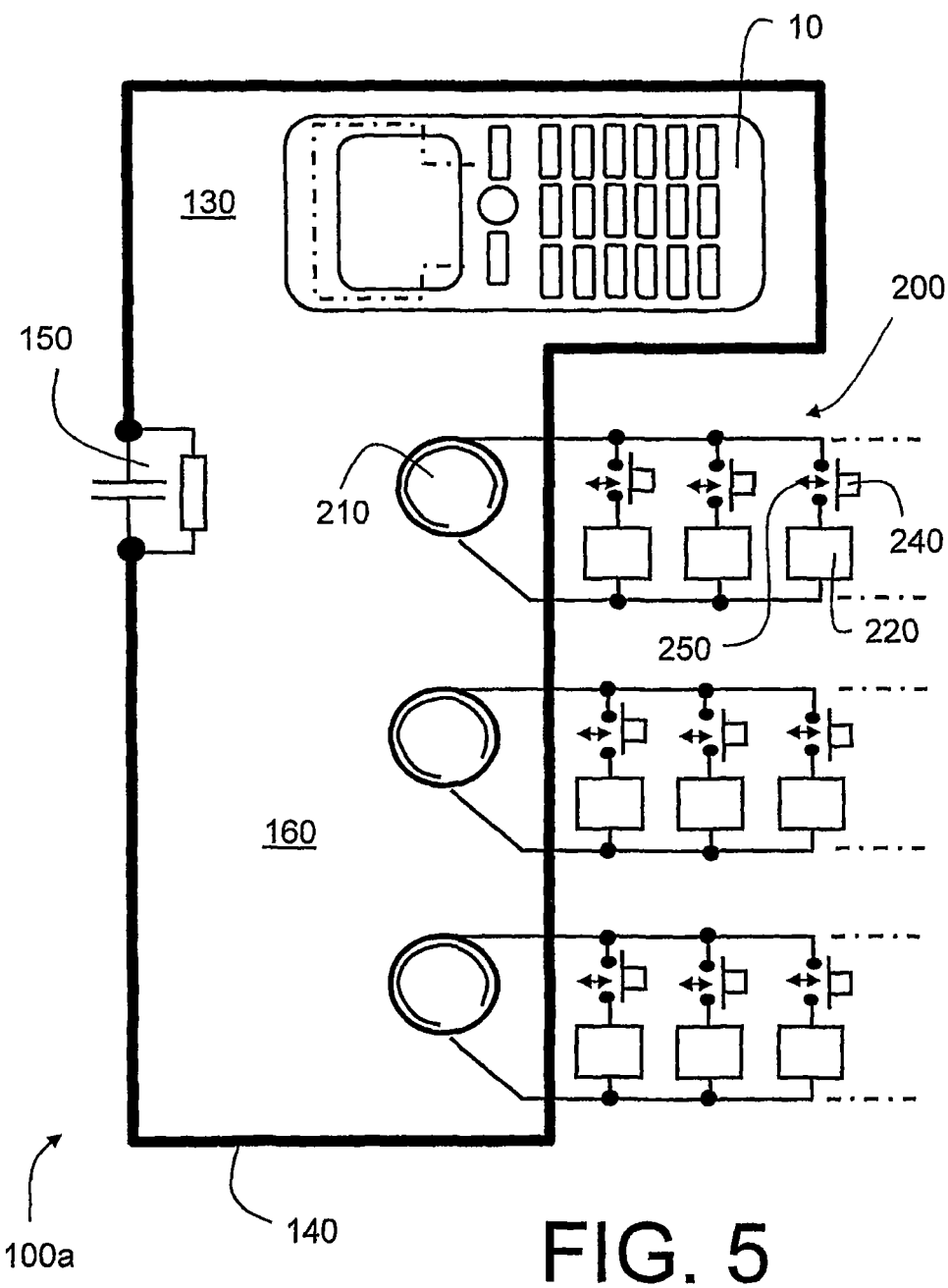
FIG. 5 is an illustration of internal component parts of the external keyboard illustrated in FIG. 3.

Construction of the external keyboard 100a will now be further elucidated with reference to FIG. 5. The keyboard 100a includes an inductor 140 implemented as a conductive loop and comprising one or more turns of conductor. Optionally, the inductor 140 includes only a single turn of conductor. The inductor 140 has connected in series therewith a capacitor and resistor denoted collectively by 150. The capacitor and resistor 150 are operable to form a resonant circuit with the inductor 140, the resonant circuit optionally having a Q-factor in a range of 10 to 100, and more preferably in a range of 20 to 50. Whereas a high Q-factor approaching 100 for the resonant circuit enables it to couple the keyboard 100a highly efficiently to the mobile telephone 10, tuning of the resonant circuit becomes more critical depending a nature of ferromagnetic components present within the mobile telephone 10. Conversely, a Q-factor below 10 is sub-optimal because coupling of near-field radiation from the mobile telephone 10 is less efficient, although tuning of the resonant circuit is then less critical. Thus, a Q-factor for the resonant circuit in a range of 20 to 50, more preferably 40, is found to be an ideal practical compromise for the keyboard 100a.

The inductor 140 is preferably fabricated by way of a metallic thin film formed on an insulating layer, for example on a Kapton polyimide polymer film. Moreover, the resistor and capacitor 150 are optionally implemented as surface-mounted components added to the inductor 140. Alternatively, the capacitor and resistor 150 are implemented as thin-film printed and/or laminated components as will be elucidated in more detail later.

The resonant circuit formed by the inductor 140 in combination with the capacitor and its resistor 150 is arranged to have a resonant frequency of substantially 13.56 MHz when the mobile telephone 10 is placed upon the region 130 as illustrated in FIG. 4. Moreover, the aforesaid Q-factor of the resonant circuit is selected so that various types of digital apparatus placed in the region 130 do not detune the resonant circuit formed by the inductor 140 and the capacitor 150 to an extent that the keyboard 100a is not able to function.

As shown in FIG. 5, the inductor 140 encloses the region 130 and also an additional region 160 adjacent to the region 130. A summation of the regions 130, 160 describes a total region which is magnetically encircled by the inductor 140. By rendering the additional region 160 of greater area in comparison to the region 130 renders the resonant circuit including the inductor 140 less sensitive to being detuned away from a frequency of 13.56 MHz when various types of digital apparatus including ferromagnetic components are placed upon the region 130.

As shown in FIG. 5, the keyboard 100a further includes one or more RFID circuits, for example a RFID circuit indicated by 200; optionally, the keyboard 100 includes a plurality of such RFID circuits 200. Each circuit 200 includes an inductor 210 overlaying at least in part the additional region 160 and thereby magnetically coupled in operation to the inductor 140. Moreover, each circuit 200 includes one or more RFID integrated circuits 220 coupled in series with one or more corresponding switches 240 respectively as illustrated; each circuit 200 optionally includes a plurality of RFID integrated circuits 220. In operation, actuation of the switch 240 as denoted by an arrow 250 causes the switch 240 to change from a non-conducting state to a conducting state for connected its RFID integrated circuit 220 across the inductor 210 and hence in communication with the resonant circuit including the inductor 140.

Figure 6:
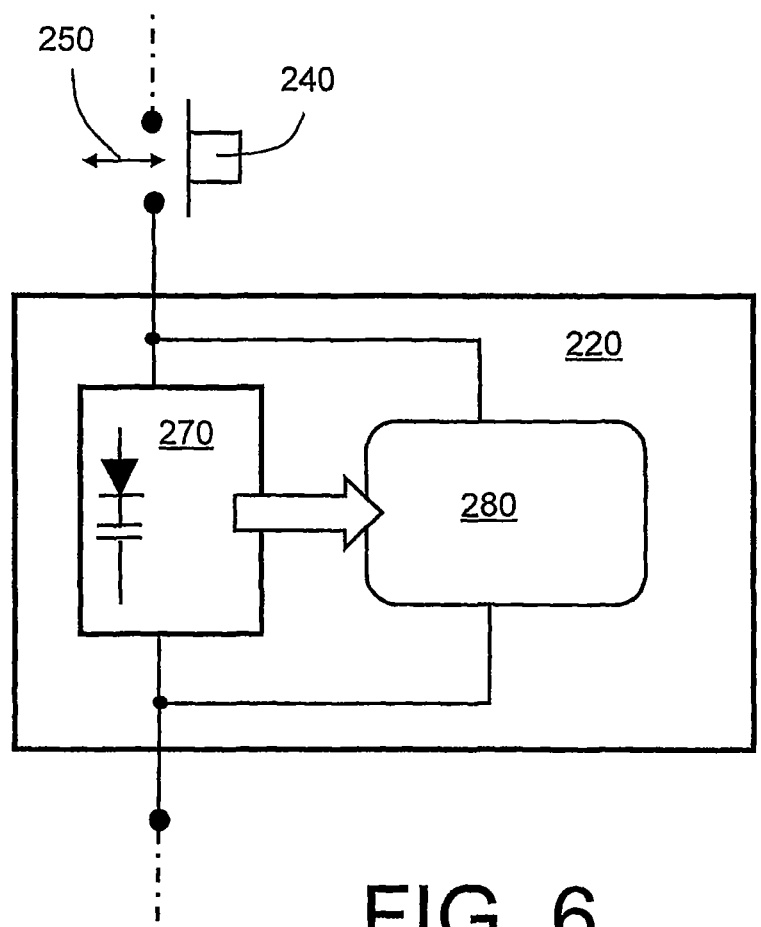
FIG. 6 is an illustration of a radio frequency identification device (RFID) integrated circuit included within the external keyboard shown in FIG. 3.

The RFID integrated circuit 220 is optionally a proprietary device as illustrated in FIG. 6 which includes a rectification circuit 270 for powering a digital unit 280 of the integrated circuit 220 by way of interrogating signals coupled from the mobile telephone 10 placed upon the region 130; the mobile telephone 10 communicates at a frequency of substantially 13.56 MHz via the resonant circuit including the inductor 140 and subsequently via the inductor 210 to the RFID integrated circuit 220. By such a manner of operation, the keyboard 100a is capable of being operated with power provided solely from the mobile telephone 10, thereby the keyboard 100a is susceptible to being implemented to be devoid of any source of power therein, for example devoid of any form of battery or similar therein. Such an implementation is attractive for users of the keyboard 100a, because a need for users to be concerned with malfunction of the keyboard 100a due to battery expiration occurring therein is circumvented.

Beneficially, the inductor 210 is implemented to have multiple turns, for example in a range of 5 to 100 turns. Moreover, the inductor 210 is preferably implemented using one or more of: thin-film printing, etched or vacuum-deposited conductors which are suitably spatially arranged to form the inductor 210. Alternatively the inductor 210 can be fabricated using a spool of insulated wire, for example 0.1 mm diameter enamelled copper wire. Thus, the inductor 140 in combination with the one or more inductors 210 effectively forms a transformer which is advantageous for generating a sufficient rectified potential within the RFID integrated circuits 220 for rendering them functional when their corresponding keys of the keyboard 100a are user-actuated.

The one or more RFID integrated circuits 220 are preferably proprietary silicon devices mounted within the keyboard as bare die, for example by gold-ball bump bonding. Alternatively, the RFID integrated circuits 220 can be implemented in printed thin-film form using organic polymers capable of forming organic semiconductor devices. Fabrication of electronic circuits using printable semiconductor polymer inks has been previously described, for example as in published international PCT patent applications nos. PCT/GB2004/000433 (WO 2004/0704669 and PCT/GB2003/005435 (WO 2004/055920) for example which are hereby incorporated by reference for elucidating operation of the present invention.

Figure 7:
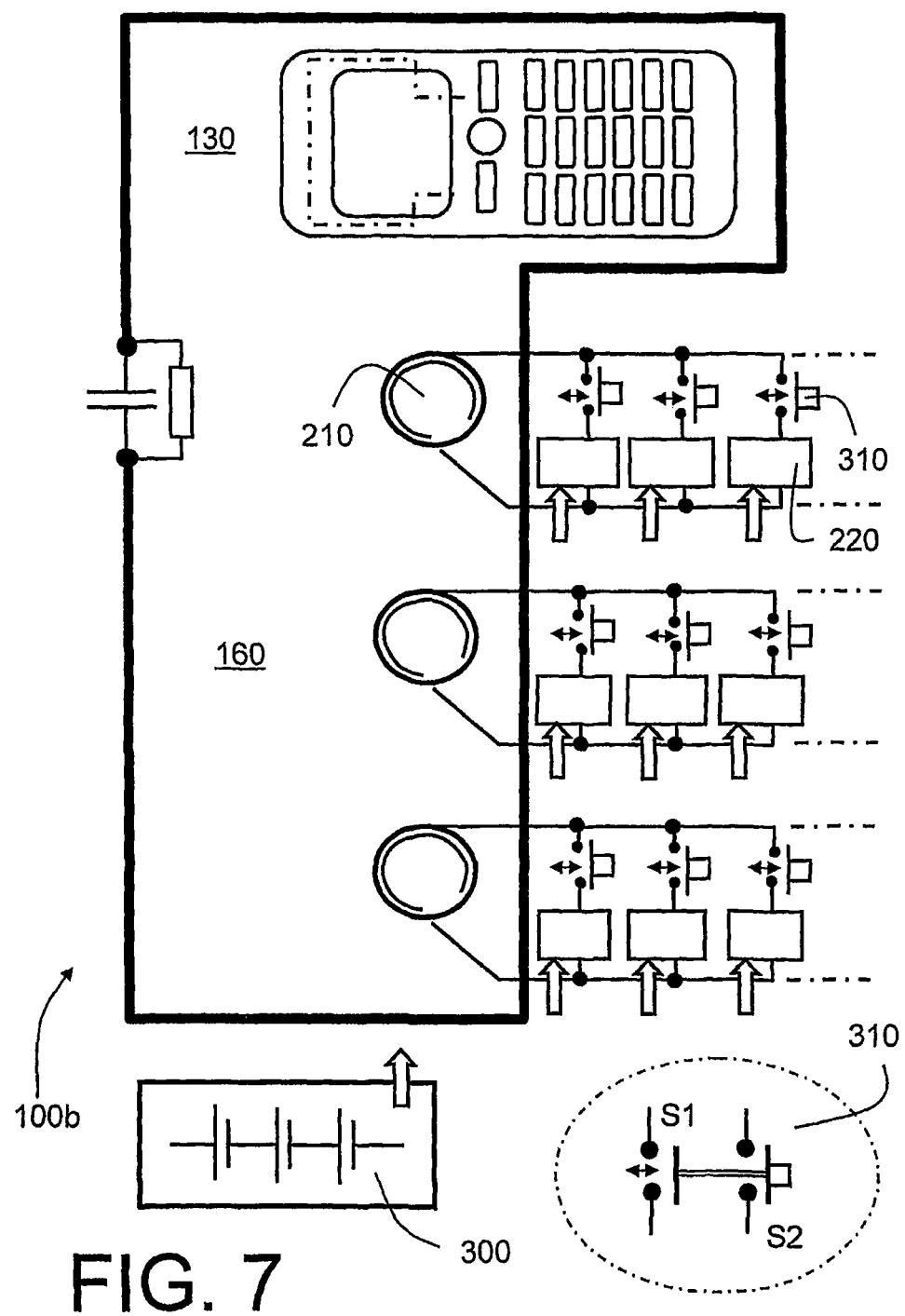
FIG. 7 is an illustration of an alternative embodiment of the external keyboard of FIG. 3, the alternative embodiment including an internal source of power, for example a battery.

Referring next to FIG. 7, an alternative embodiment of a keyboard pursuant to the present invention is indicated generally by 100b. The keyboard 100b depicted schematically in FIG. 7 is generally similar to the aforesaid keyboard 100a depicted in FIG. 5 except that the keyboard 100b is susceptible to being optionally implemented to include a source power internal thereto. The source of power is beneficially a battery comprising one or more cells as illustrated in FIG. 7; the battery is denoted by 300. The battery 300 can be a component part which is added during fabrication of the keyboard 100b and sealed therein. Alternatively, the battery 300 can be user-accessible and optionally user-servicable, namely replaceable by the user. Alternatively, the battery 300 is miniature rechargeable device. Yet more optionally, the battery 300 can be implemented by way of thin-film printed technologies. Beneficially, switches 310 associated with keys of the keyboard 100b illustrated in FIG. 7 are provided with a plurality of sets of contacts, for example a first set of contacts S1 for connecting a given RFID integrated circuit 220 to the battery 300 for providing operating power the integrated circuit 220, and a second set of contacts S2 for connecting the given RFID integrated circuit 220 to its associated inductor 210 and thereby via the resonant circuit including the inductor 140 to the mobile telephone 10 or similar apparatus placed upon the region 130.

Figure 8:
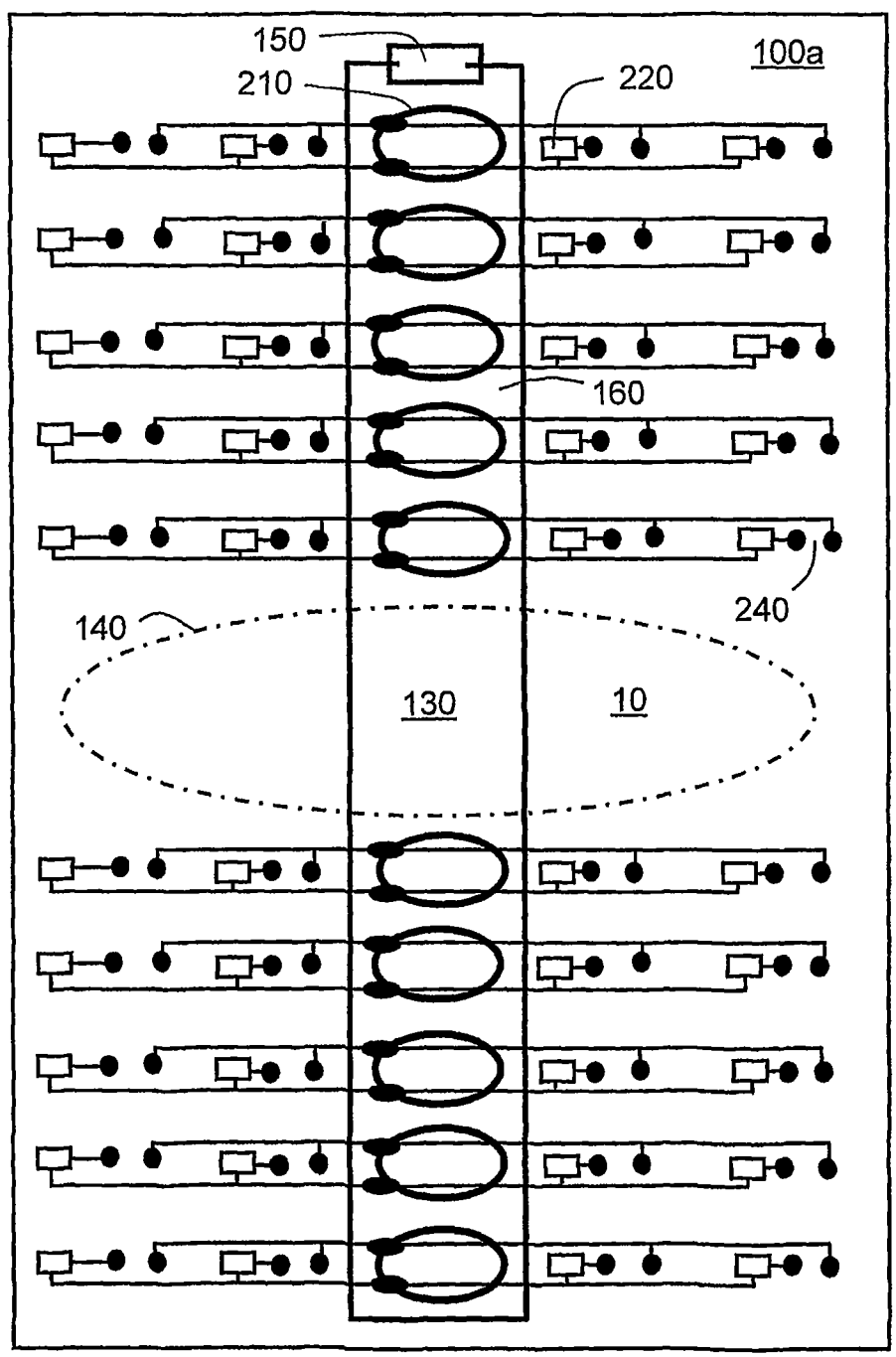
FIG. 8 is a schematic illustration of an implementation of the external keyboard as shown in FIG. 3 wherein a region of the keyboard for coupling to the mobile telephone only overlays a sub-portion of an interface area presented by the mobile telephone of FIG. 1 when placed in operation upon the keyboard.

In FIG. 8, there is shown an illustration of internal components of the keyboard 100a shown in FIG. 3. The additional region 160 of the inductor 140 onto which the inductors 210 are overlaid has a considerably greater area, for example more than 3 times the area, in comparison to the region 130 onto which the mobile telephone 10 or similar is overlaid in operation. As elucidated in the foregoing, such a ratio of areas is beneficial in rendering the tuned circuit formed by the inductor 140 coupled to the capacitor and its resistor 150 less susceptible to becoming detuned in response to ferromagnetic or paramagnetic components present in the mobile telephone 10 or similar being placed upon the region 130.

Figure 9:
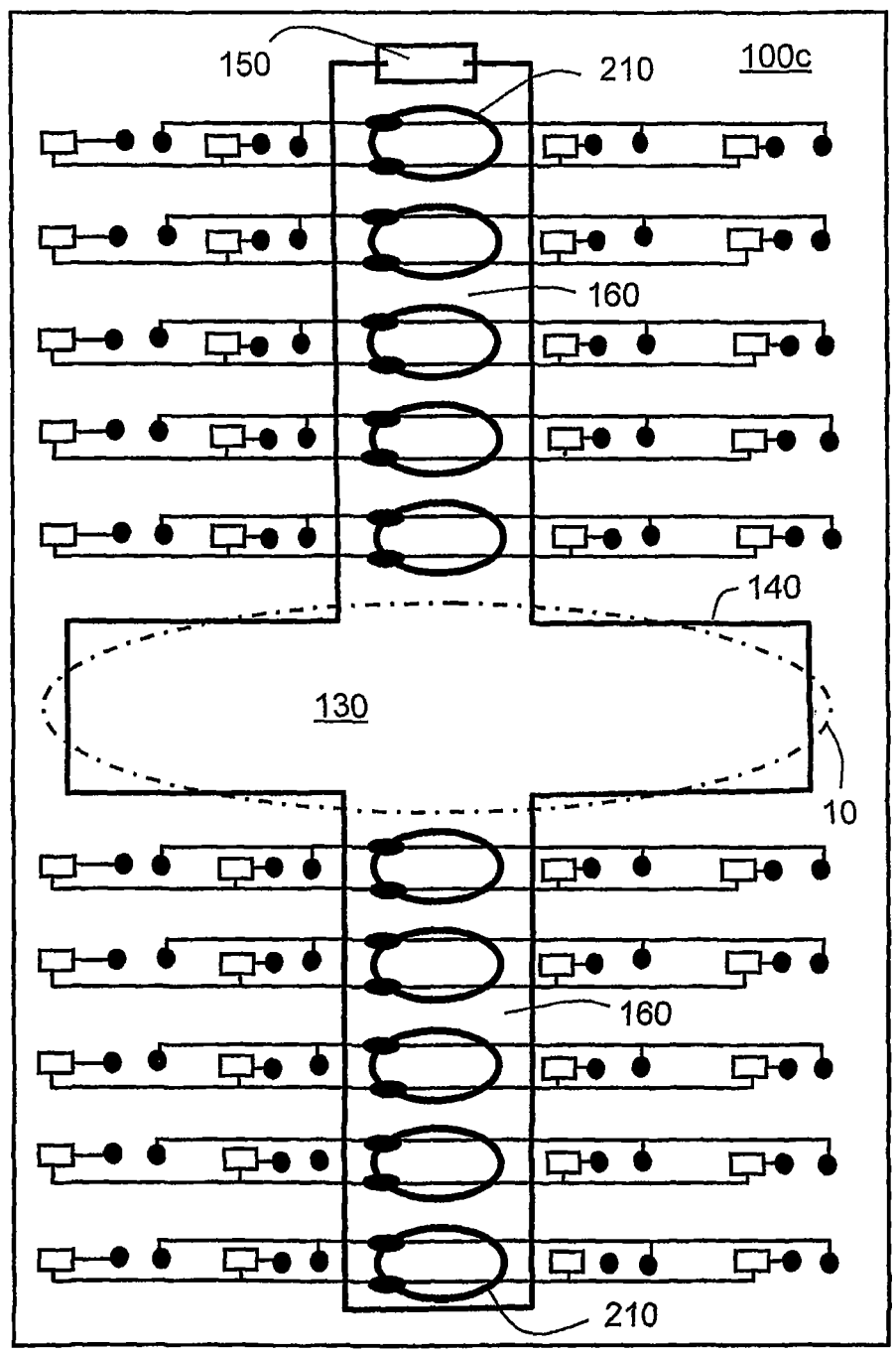
FIG. 9 is a schematic illustration of an implementation of the external keyboard as shown in FIG. 3 wherein a region of the keyboard for coupling to the mobile telephone only overlays substantially an entire interface area presented by the mobile telephone of FIG. 1 when placed in operation upon the keyboard.

In FIG. 9, an alternative embodiment of the keyboard is denoted by 100c. The keyboard 100c is similar to the keyboard 100a shown in FIG. 8 with an exception of the region 130 being enlarged so that it substantially encloses an entire area of the mobile telephone 10 or similar when placed upon the keyboard 100c. Such an implementation renders the resonant circuit comprising the inductor 140 and the capacitor and resistor 150 more vulnerable to becoming detuned from 13.56 MHz but nevertheless results in a greater energization energy being coupled in operation between the RFID integrated circuits 220 and the mobile telephone 10 or similar placed upon the region 130. In FIG. 9, the region 130 is substantially similar in area to the additional region 160 overlaying onto the aforesaid inductors 210.

Figure 10:
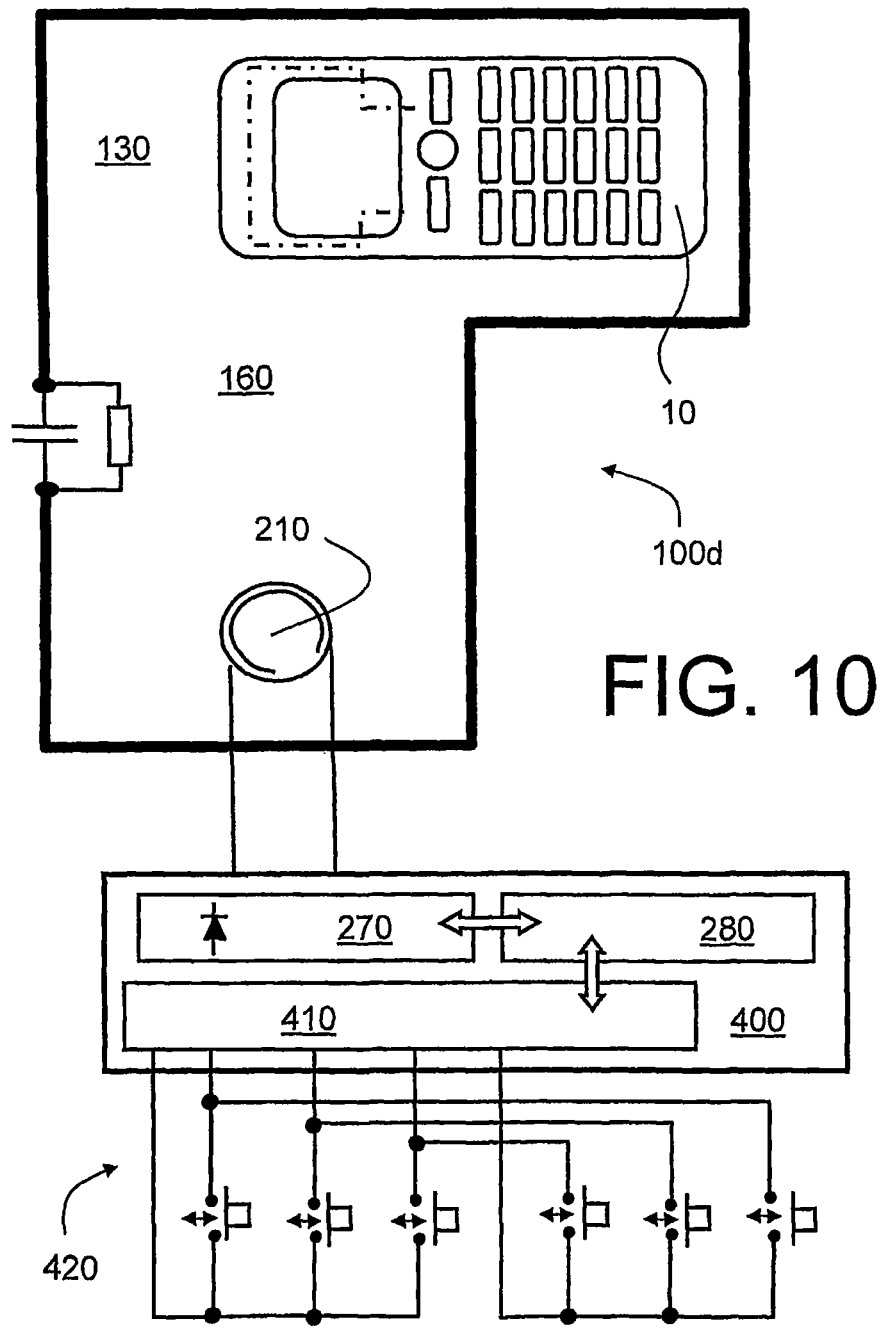
FIG. 10 is a schematic diagram of an implementation of the external keyboard as shown in FIG. 3 wherein a multiplexing radio frequency identification device (RFID) integrated circuit is employed to interface to a plurality of user-actuated keys.
Figure 11:
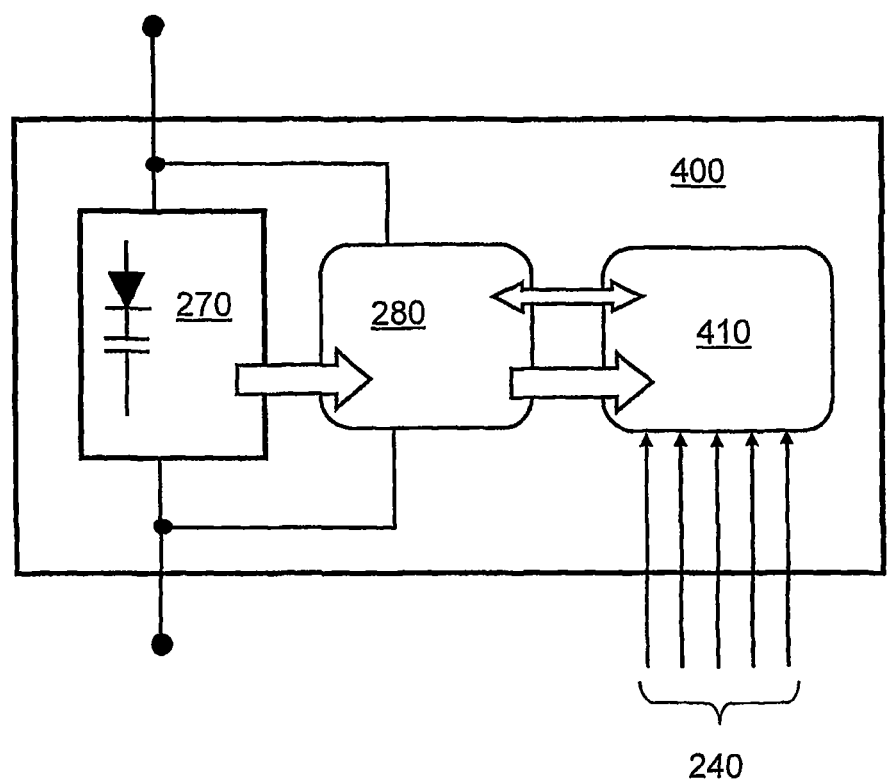
FIG. 11 is a schematic illustration of internal component parts of the multiplexing radio frequency identification device (RFID) integrated circuit employed within the keyboard as depicted in FIG. 10.

In order to simplify manufacture of the external keyboard 100 by reducing a number of RFID integrated circuits 220 required therein, the keyboard is optionally implemented as illustrated in FIG. 10 wherein the keyboard is indicated generally by 100d. In the keyboard 100d, there is included an RFID integrated circuit denoted by 400 which includes the aforesaid rectification circuit 270 and the aforementioned digital unit 280. The RFID integrated circuit 400 further includes a multiplexer 410 as illustrated in both FIGS. 10 and 11 so that the RFID integrated circuit 400 when activated scans a plurality of switches indicated by 420 to determine which of the switches 420 have been depressed. Moreover, the RFID integrated circuit 400 is operable when energized by the mobile telephone 10, alternatively by a personal digital assistant (PDA) or similar apparatus, when placed upon the region 130 of the keyboard 100d as shown in FIG. 10. When energized, the RFID integrated circuit 400 scans the switches 420 and communicates back via its associated inductor 210 and then via the inductor 140 back to the mobile telephone 10 placed upon the region 130. Optionally, the RFID integrated circuit 400 is provided with connections thereon which are unique for each of the switches 420. Alternatively, or additionally, the RFID integrated circuit 400 is provided with a column-and-row matrix multiplexing arrangement as illustrated for reducing a number of connections required from the RFID integrated circuit 400 to the switches 420. Yet more optionally, the RFID integrated circuit 400 is powered from a battery included within the keyboard 100d as illustrated in FIG. 10. Beneficially, the RFID integrated circuit 400 is operable to derive its power from energy coupled thereto via the inductors 140, 210 from the mobile telephone 10 and optionally operable only to switch to power derived from the battery when insufficient power is provided from the mobile telephone 10 placed upon the region 130.

Figure 12:
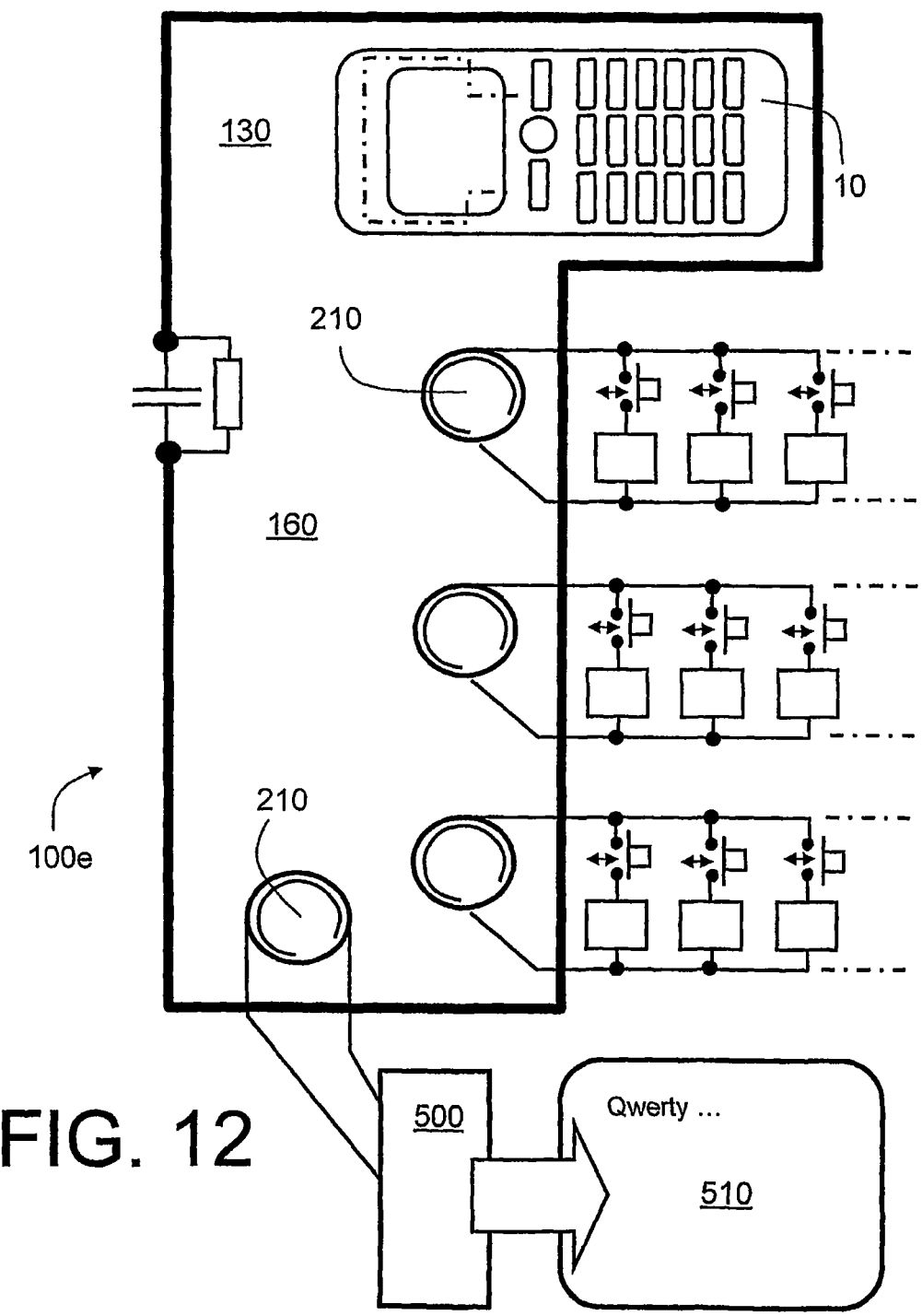
FIG. 12 is a schematic diagram of an implementation of the external keyboard of FIG. 3 incorporating a flexible electronic display.

Referring next to FIG. 12, a keyboard pursuant to the present invention is indicated generally by 100e and is similar to the keyboard 100a except that the keyboard 100e additionally includes an electronic display 510 connected to an electronic driver unit 500 which is further connected to an inductor 210 for coupling into the inductor 140 as shown in FIG. 12. The electronic display 510 is beneficially fabricated as a flexible region on the keyboard 100e using electronic printed devices, thereby rendering the keyboard 100e including such display flexible so that it can be folded or rolled for storage when not in use. Moreover, the display 510 is optionally fabricated using technology as described in published United States patent application no. US 2006/0181751 which concerns utilizing electric fields for manipulating charged bodies to generate visual contrast for presenting visual images; contents of this patent application are hereby incorporated by reference for describing embodiments of the present invention. The electronic driver unit 500 is optionally implemented as an integrated circuit assembled as a surface-mounting component within the substrate 110 or as a printed electronic circuit as elucidated in the foregoing. Thus, the mobile telephone 10, or personal digital assistant (PDA) or similar, placed upon the region 130 is operable to communicate display information, for example text and images, at 13.56 MHz carrier frequency via the inductors 140, 210 to the electronic display 510 so that that visual Information can be user-presented in a larger spatial format than possible via the display screen 20 of the mobile telephone 10 illustrated in FIGS. 1 and 2. The electronic driver unit 500 is operable to receive a stream of image data and appropriately multiplex the image data when driving pixel cells of the electronic display 510. Power for operating the electronic driver unit 500 is preferably derived from the mobile telephone 10 or similar placed upon the region 130 as depicted in FIG. 4. Implementing the keyboard 100 in a manner as illustrated in FIG. 12 enables both problems of the display screen 20 and the keyboard 30 being too small for comfortable use over longer periods of use, for example several hours of continuous use, to be advantageously addressed.

Figure 13:
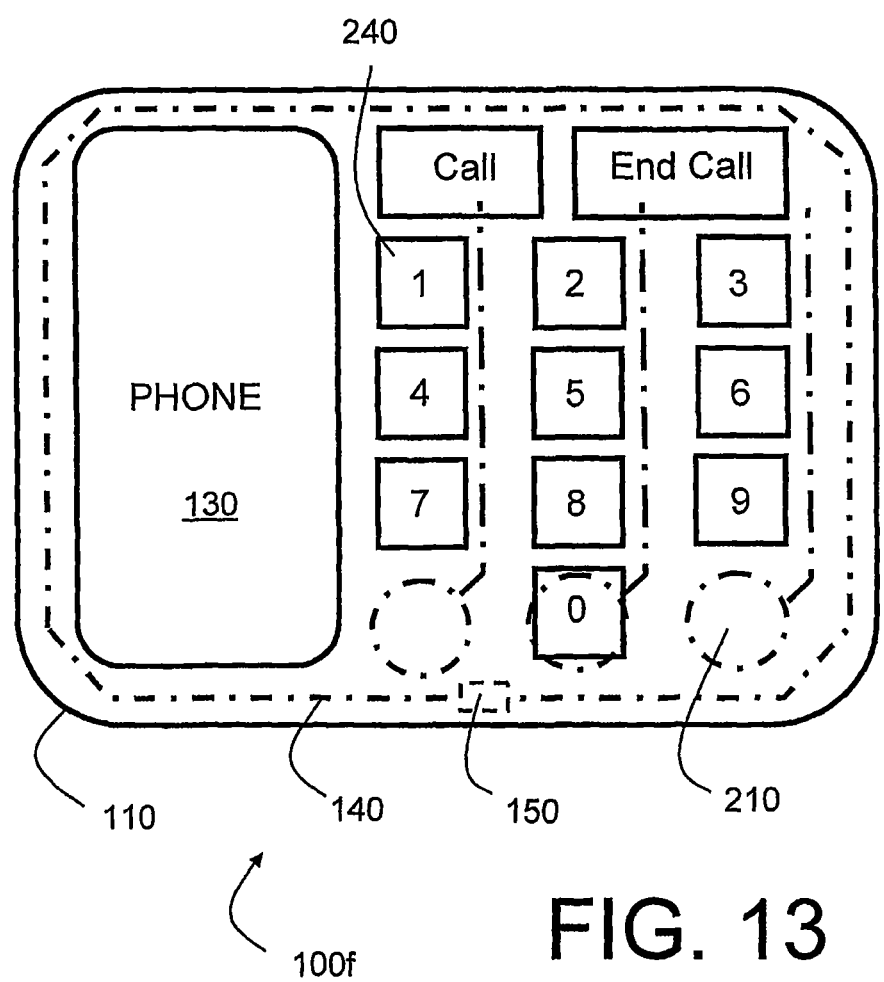
FIG. 13 is a schematic illustration of a simplified implementation of the keyboard of FIG. 3, the simplified implementation being adapted for numerical data entry to the mobile telephone or similar illustrated in FIG. 1.

The keyboard 100a as illustrated in FIG. 3 is susceptible to being implemented in simpler form as shown in FIG. 13. The keyboard shown in FIG. 13 is denoted by 100f and is based on implementations of the aforesaid keyboards 100a to 100e. The keyboard 100f has its region 130 for receiving the mobile telephone 10 offset to a left-hand side of its substrate 110 as seen by a user thereof in operation; optionally, for the keyboard 100f, the region 130 can alternatively be included to a right-hand side of the substrate 110 as seen by the user in operation. Moreover, the keys 240 in FIG. 13 are specifically arranged for ease of dialling numbers for making telephone calls, preparing SMS messages and for general numerical data entry. Such a format either enables larger keys 240 to be employed for the keyboard 100f in comparison to implementation of the keyboard 100a in FIG. 3, for example for rendering the keyboard 100f in FIG. 13 easier to use by people lacking fine muscle motor control. Alternatively, such a format enables the substrate 110 of the keyboard 100f illustrated in FIG. 13 to be smaller in size than the keyboard 100a shown in FIG. 3 for enhancing its portability and easing its storage requirements when not deployed.

Figure 14:
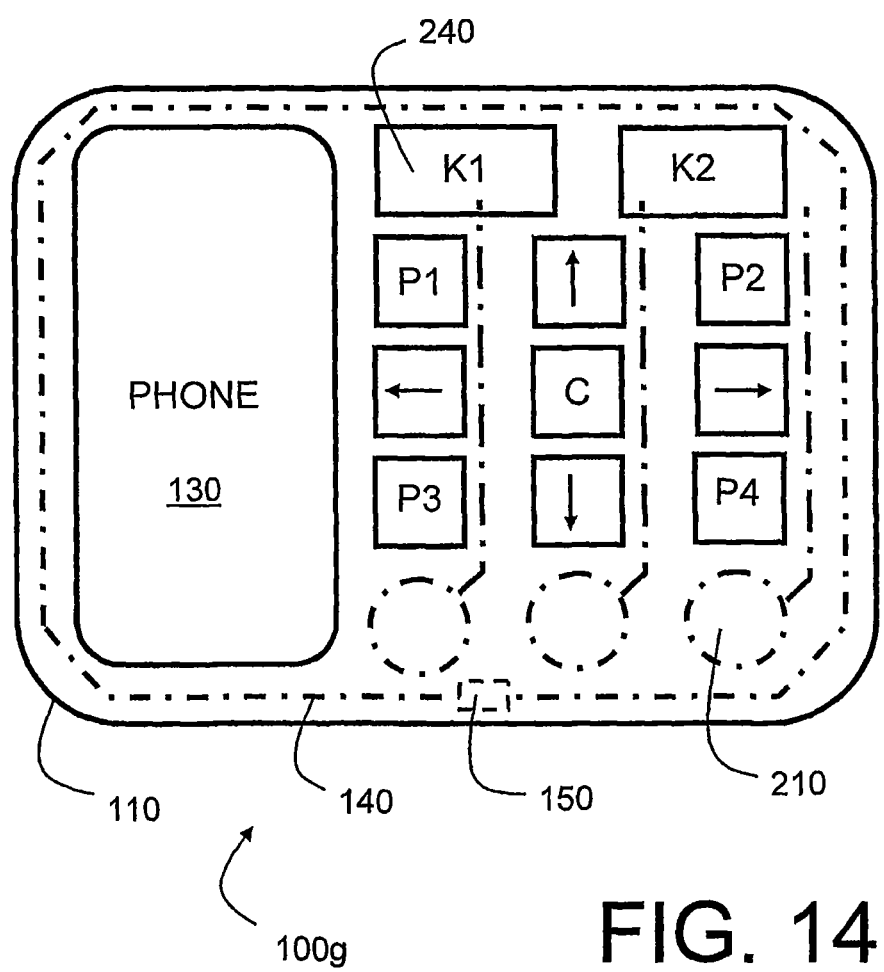
FIG. 14 is a schematic diagram of a simplified implementation of the keyboard of FIG. 3, the simplified implementation being adapted for game playing activities in cooperation with the mobile telephone or similar illustrated in FIG. 1.

Alternatively, the keyboard 100 as illustrated in FIG. 3 is susceptible to being implemented in simpler form as shown in FIG. 14 as indicated generally by 100g. The keyboard 100g illustrated in FIG. 14 has the region 130 for receiving the mobile telephone 10, personal digital assistant (PDA) or similar to a left-hand side of the substrate 110 as seen by a user in operation; optionally, the region 130 can alternatively be included to a left-hand side of the substrate 110 as seen by the user in operation. Moreover, the keys 240 of the keyboard 100g in FIG. 14 are specifically arranged for ease of control for playing interactive games and similar on the mobile telephone 10, personal digital assistant (PDA) or similar placed upon the region 130 in use.

Figure 15:
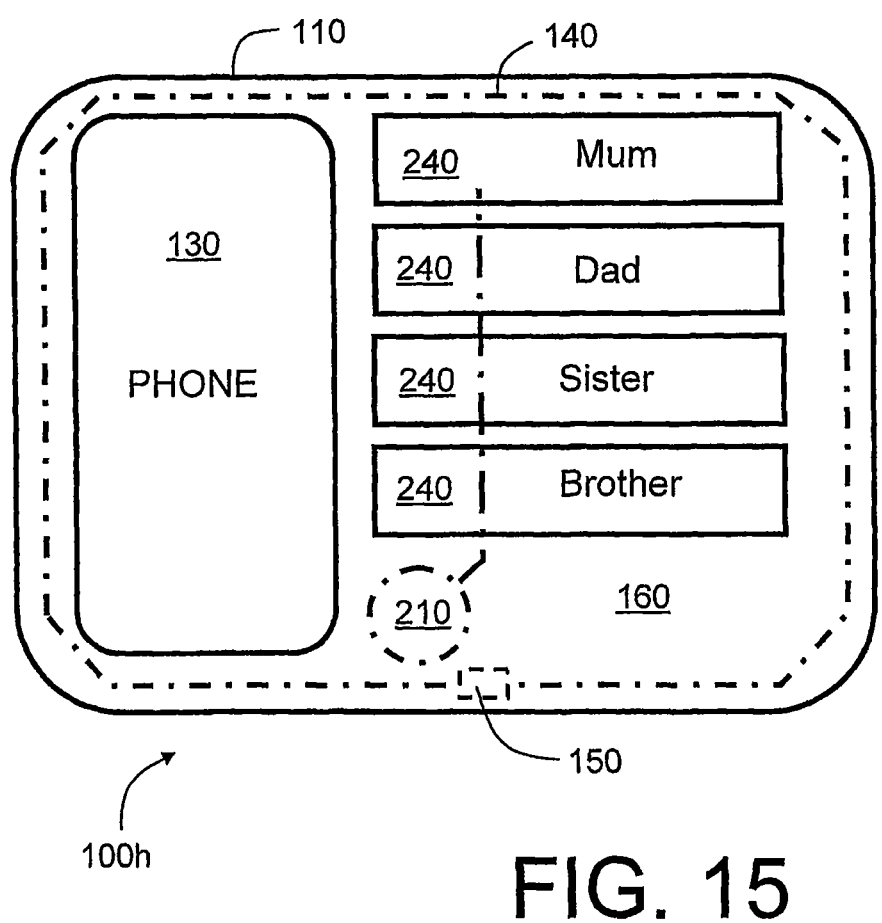
FIG. 15 is a schematic diagram of a simplified implementation of the keyboard of FIG. 3, the simplified implementation being adapted for communication to a small subset of defined people using the mobile telephone or similar illustrated in FIG. 1.

Yet alternatively, the keyboard 100a as illustrated in FIG. 3 is susceptible to being modified to be implemented in simpler form as shown in FIG. 15 as indicated generally by 100h. The keyboard 100h illustrated in FIG. 15 has the region 130 for receiving the mobile telephone 10, personal digital assistant (PDA) or similar to a left-hand side of the substrate 110 as seen by a user in operation; optionally, the region 130 can alternatively be included to a left-hand side of the substrate 110 as seen by the user in operation. Moreover, the keys 240 of the keyboard 100h in FIG. 15 are specifically arranged for ease of dialing specific telephone numbers, for example for dialing close relatives such as mother, father, brother and/or sister. In operation, user actuation of one or more of the switches 240 of the keyboard 100h causes a message to be communicated to the mobile telephone 10 placed upon the region 130 of the keyboard 100h for invoking pre-programmed numbers entered into the telephone 10. The keyboard 100h of FIG. 15 is especially beneficial for young children who have difficulty learning and typing out long streams of digits and also for elderly people with impaired cognitive abilities.

In various versions of the keyboard 100a, 100b, 100c, 100d, 100e, 100f, 100g, 100h elucidated in the foregoing, the RFID integrated circuit 220 together with its switch 240 can be implemented in various ways. In FIG. 16a, the RFID integrated circuit 220 is connected in series with its aforesaid inductor 210 and coupled to two contacts of its switch 240 which are mutually connected together by a single movable conductor 600 when the switch 240 is user-actuated. Optionally, the inductor 210 is provided with a tuning circuit 610, for example a tuning capacitor optionally in parallel with a Q-factor determining resistor, for tuning to 13.56 MHz, thereby preventing interference at frequencies other than substantially 13.56 MHz propagating to the RFID integrated circuit 220. In FIG. 16b, the RFID integrated circuit 220 is illustrated optionally incorporated into a button, namely key, of the switch 240. In FIG. 16c, the RFID integrated circuit 220 together with its inductor 210 are shown all integrated into the button, namely key, of the switch 240; such an implementation is of benefit in that it enables keys 120 of the keyboard 100 to be mounted more closely together whilst maintaining their exposed user-accessible top surface area conveniently large for ease of use.

In the foregoing, near-field magnetic coupling of the mobile telephone 10 or similar apparatus placed upon the region 130 as illustrated in FIG. 4 to the keyboard 100a is illustrated. However, it will be appreciated that corresponding electrostatic, namely capacitive, coupling is also feasible. When the keyboard 100a, 100b, 100c, 100d, 100e, 100f, 100g, 100h is implemented in such a manner, its circuit configuration is susceptible to being implemented in a form as illustrated in FIGS. 17a and 17b.

In FIG. 17a, the telephone 10 is provided with a patch antenna 900 therein; the patch antenna 900 is conveniently implemented as a conductive plate. Moreover, the substrate 110 of the keyboard implemented electrostatically has a floating conductive plane 910, for example a laminated metal layer which forms a capacitor C1 with the patch antenna 900 in operation. The substrate 110 also includes a conductive earth plane 920 E laminated or otherwise incorporated therein. The floating conductive plane 910 forms a capacitor C2 with the aforesaid conductive earth plane 920 E. Adjacent over a region of the floating conductive plane 910 is an electrode plane 930 forming a capacitor C3 with the floating conductive plane 910. Moreover, the electrode plane 930 is connected via an inductor L to the conductive earth plane 920 E. The inductor L is either an added surface mounted component or fabricated by suitably forming conductive tracks within the substrate 110. The capacitors C2 and C3 form a series capacitor denoted by CR having a capacitance as defined by Equation 1 (Eq. 1):

$$CR = \frac{C2 \cdot C3}{(C2 + C3)} \qquad \text{Eq. 1}$$

Moreover, the series capacitor CR forms a resonant circuit with the inductor L, the resonant circuit having a resonant frequency $f_0$ defined by Equation 2 (Eq. 2):

$$f_0 = \frac{1}{2\pi\sqrt{CR \cdot L}} \qquad \text{Eq. 2}$$

The frequency $f_0$ is adjusted, for example by suitable choice of inductance value for the inductor L, to be substantially 13.56 MHz. In close proximity within the substrate 110 are included additional electrode plates 940 forming capacitors C4 with the electrode plane 930. Switches 240 associated with the keys of the keyboard selectively connect RFID integrated circuits 220 to the additional electrode plates 940 for activating the RFID integrated circuits 220 in operation.

FIG. 17b is in illustration of a circuit implementation for the keyboard when implemented pursuant to FIG. 17a. The resonant circuit formed by the capacitors C2 and C3 in combination with the inductor L are operable to magnify, by resonance at 13.56 MHz, a signal developed across the capacitor C2 by a Q-factor of the resonant circuit. A signal developed across the inductor L is selectively coupled, in response to keys of the keyboard when implemented electrostatically as described being depressed, via the capacitors C4 to their respective RFID integrated circuits 220; the integrated circuits 220 are thereby activated and operable to communicate back via the capacitors C4, C3 and C1 to the mobile telephone 10 or similar placed upon the aforesaid floating conductive plane 910 forming a plate of the capacitor C2.

In the foregoing, operation of the keyboard pursuant to the present invention by magnetic coupling and also by electrostatic coupling have both been described. It will be appreciated that embodiments of keyboards pursuant to the present invention can be implemented to employ a combination of both magnetic and electrostatic coupling techniques; for example, the keyboard 100 is susceptible in one embodiment to being implemented to employ magnetic coupling from the mobile telephone 10 or similar to the resonant circuit implemented by the inductor 140 and the capacitor 150, followed by electrostatic coupling from the resonant circuit to the RFID integrated circuits 220 via switched. Other combinations of coupling technique are also feasible when implementing embodiments of the keyboard pursuant to the present invention.

When electrostatic coupling, namely capacitive coupling, is employed as illustrated in FIGS. 17a and 17b, switches 240 associated with keys of the keyboard can be implemented capacitive, thereby enhancing reliability of the keyboard by circumventing a need for electrical contact to be made in operation. When adjacent conductors are moved to be mutually closer together, a capacitive coupling therebetween is increased. Thus, a capacitive coupling switch for use with keys in the implementation of the keyboard as illustrated in FIGS. 17a, and 17b is indicated generally by 1000 in FIG. 18. The capacitive coupling switch 1000 includes a first electrode plate 1010 embedded within or onto the substrate 110 of the keyboard, and second electrode plate 1020 within a key of the keyboard. The key is fabricated from a highly elastic material, for example soft silicone rubber. Optionally, the highly elastic material can include one or more voids, namely one or more cavities, therein. In operation, a force applied by a user to an exposed upper surface of the key causes the key to be elastically deformed towards the substrate, thereby bringing the electrode plates 1010, 1020 into mutually closer proximity, and thereby increasing a capacitance therebetween for coupling more 13.56 MHz signal therebetween.

Although, operation of embodiments of the invention are described in the foregoing as employing signals having predominantly a frequency of 13.56 MHz, it will be appreciated that embodiments of the invention are readily modifiable to operate at frequencies other than 13.56 MHz.

Figure 1:
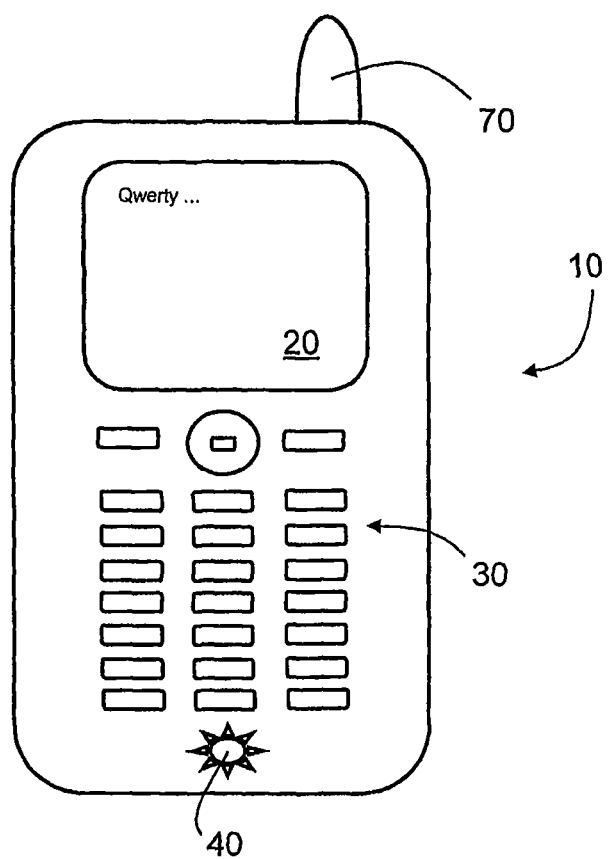
FIG. 1 is a schematic illustration of a known contemporary mobile telephone, also known as a cell-phone.
Figure 2:
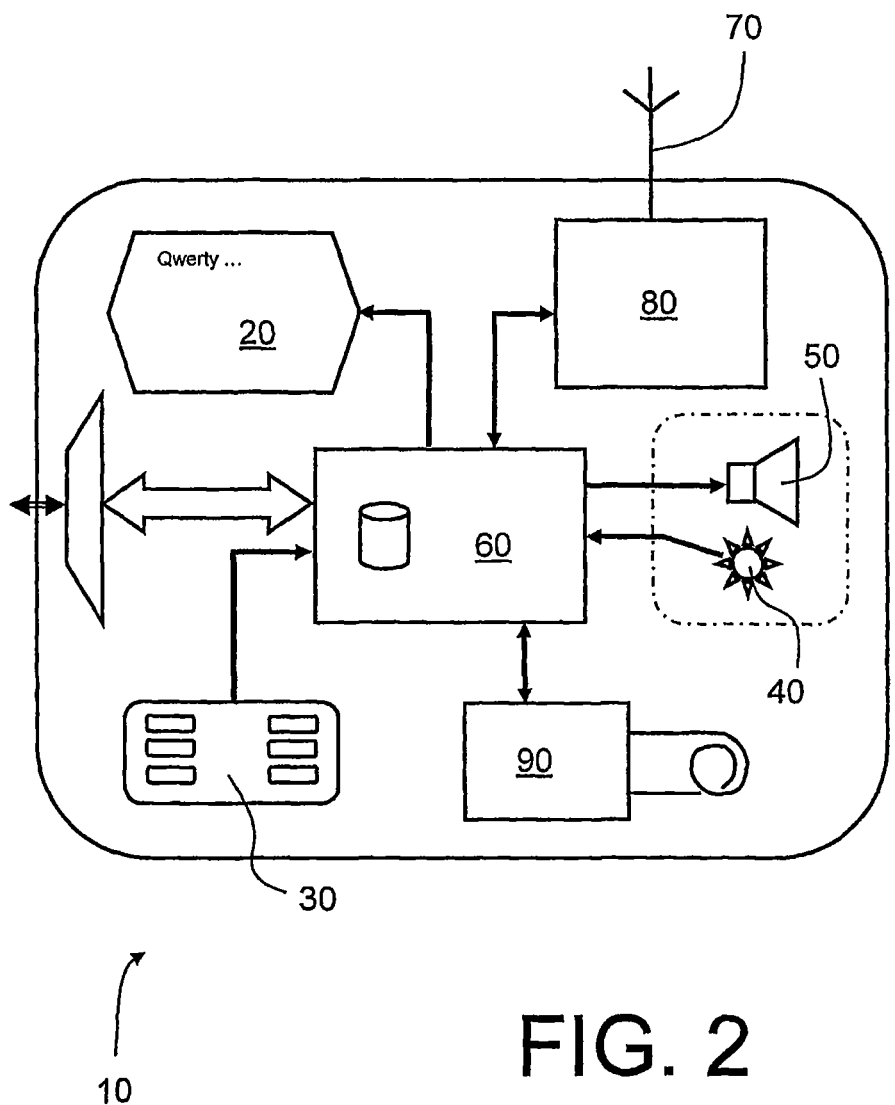
FIG. 2 is a schematic illustration of component parts comprising the mobile telephone of FIG. 1.

Referring to the mobile telephone 10 illustrated in FIGS. 1 and 2, a software product is susceptible to being downloaded to memory of the data processor 60 for rendering the telephone 10 operable with various embodiments of the keyboard pursuant to the present invention described in the foregoing. Execution of the software product causes the data processor 60 to activate the wireless interface 90 to emit interrogating radiation, for example at a frequency of 13.56 MHz. When the telephone 10 is placed in close proximity to the aforesaid region 130 of the keyboard 100, energy is selectively coupled, in response to user activation of one or more keys of the keyboard 100, to one or more RFID integrated circuits 220 of the keyboard 100. The one or more selectively coupled RFID integrated circuits 220 are energized and subsequently respond by outputting a signature code signal unique thereto. The signature code signals propagate back via the region 130 to the mobile telephone 10 and are finally received at the data processor 60 for use therein. For example, the data processor 60 is optionally operable to display a symbol of the display screen 20 and/or output a signal to cause such a symbol to appear on the display 510 of the keyboard when included as depicted in FIG. 12. The software product is preferably written in Java or Javascript, although other computer languages can be employed; moreover, the software product is beneficially loaded into the mobile telephone 10 via a wireless carrier signal or via a physical data carrier such as a miniature optical disc or plug-in solid state data memory. Similar considerations for the data product pertain mutatis mutandis when the mobile telephone 10 is substituted with an alternative device, for example a personal digital assistant (PDA) or similar.

Modification to embodiments of the invention described in the forgoing is feasible without departing from the scope of the invention as defined by the accompanying claims.

Referring to FIGS. 8 and 9, columns of keys in the keyboards 100a, 100c shown are beneficially, for improving energy coupling efficiency and ease of manufacture, each provided with a corresponding single inductor 210 for their respective RFID integrated circuits 220 instead of each RFID integrated circuit 220 being provided individually with an associated respective inductor 210. Such benefit arises from a more favourable coupling being achieved by the inductor 210 lying encircled within the additional region 160 rather than being adjacent at a periphery of the additional region 160. Thus, implementations of the keyboard 100a, 100c as illustrated in FIGS. 8 and 9 are especially beneficial in operation.

Expressions such as "comprise", "include", "contain", "incorporate", "is", "have" and similar are intended to be construed in a non-exclusive manner, namely allowing for other items or components which are not explicitly defined to be present. Reference to the singular shall also be construed to refer to the plural.

Numerals included within parentheses within the appended claims are intended to assist understanding of claimed subject matter and are not intended to determine scope of the claims.

The invention claimed is:

1. A keyboard including a plurality of user-operable alpha-numeric keys, said keyboard including one or more identification devices associated with said user-operable keys, and wherein said one or more identification devices are operable to selectively communicate with a digital apparatus placed in proximity of the keyboard in response to user-actuation of one or more of said user-operable keys, said keyboard comprising a flexible substrate for enabling said keyboard to be folded and/or rolled into a non-deployed inactive state, and unfolded and/or unrolled into a deployed active state for communicating with said digital apparatus, wherein:

(a) said keyboard is operable to communicate with said digital apparatus when in proximity thereto by way of near-field magnetic coupling and/or near-field electrostatic coupling; and (b) said keyboard includes an intermediate resonant circuit for interfacing between said one or more identification devices and said digital apparatus, wherein said intermediate resonant circuit includes a component which is spatially disposed to overlay a first region onto said digital apparatus in use.

2. A keyboard as claimed in claim 1, wherein said Q-factor is in a range of 10 to 100.

3. A keyboard as claimed in claim 1 or 2, wherein said intermediate resonant circuit is only coupled for communicating alternating signals induced therein to said one or more identification devices and to said digital apparatus.

4. A keyboard as claimed in claim 1 or 2, wherein said intermediate resonant circuit is operable in operation to exhibit a resonant frequency of substantially 13.56 MHz.

5. A keyboard as claimed in claim 1 or 2, said keyboard including a source of power therein, said source of power being coupled in operation to energize said one or more identification devices in an event that insufficient power is couplable from said digital apparatus via said intermediate resonant circuit to energize said one or more identification devices.

6. A keyboard as claimed in claim 1, wherein said substrate comprises a plurality of layers bonded, laminated and/or molded together.

7. A keyboard as claimed in claim 6, wherein said plurality of layers are bonded, laminated and/or molded together in roll-good form during manufacture of the keyboard.

8. A keyboard as claimed in claim 6 or 7, wherein said plurality of layers includes at least one of: polymeric insulating layers, electrically conductive layers, printed electronic polymer layers, surface mounted electronic chip components, surface mounted passive components.

9. A keyboard as claimed in claim 2, said keyboard further including a pixel display with an associated display driver for receiving in operation data from said digital apparatus via said intermediate resonant circuit for presenting visual information to a user of said keyboard when in operation.

10. A keyboard as claimed in claim 9, wherein said pixel display is implemented using organic printable electronic components which are operable to flex when the keyboard is manipulated between its inactive folded state and its active unfolded state.

11. A keyboard as claimed in claim 1, wherein said first region is smaller in area than said second region.

12. A keyboard as claimed in claim 1, wherein said first region is arranged to have an area corresponding substantially to an area provided on said keyboard for receiving said digital apparatus in operation.

13. A keyboard as claimed in claim 1, wherein at least one of said one or more identification devices is operable to multiplex a plurality of keys of the keyboard for monitoring user-actuation thereof during operation of the keyboard.

14. A keyboard as claimed in claim 1, wherein said first region is disposed substantially centrally in said keyboard when 20 deployed in its active unfolded state.

15. A keyboard as claimed in claim 1, wherein said first region is disposed substantially asymmetrically towards a peripheral edge of said keyboard when deployed in its active unfolded state.

16. A keyboard as claimed in claim 1, said keyboard having its keys selectively spatially disposed to assist with one or more of: alpha-numerical data entry to said digital apparatus, playing games executed in communication with said digital apparatus.

17. A method of coupling a keyboard including a plurality of user-operable alpha-numeric keys in communication with a digital apparatus placed in proximity of said the keyboard, said keyboard including one or more identification devices associated with said user-operable keys, said one or more identification devices being operable to selectively communicate with said digital apparatus in response to user-actuation of one or more of said user operable keys, wherein said method includes steps of:
    (a) manufacturing said keyboard to comprise a flexible substrate for enabling said keyboard to be folded and/or rolled into a non-deployed inactive state, and unfolded and/or unrolled into a deployed active state for communicating with said digital apparatus;
    (b) communicating from said keyboard with said digital apparatus when in proximity thereto by way of near-field magnetic coupling and/or near-field electrostatic coupling; and
    (c) utilizing in said keyboard an intermediate resonant circuit for interfacing between said one or more identification devices and said digital apparatus, wherein said resonant circuit includes a component which is spatially disposed to overlay a first region onto said digital apparatus in use.

18. A software product stored and/or conveyed on a data carrier, said software product being executable on computing hardware of a digital apparatus for use in implementing a method as claimed in claim 17.

19. A keyboard including a plurality of user-operable alpha-numeric keys, said keyboard including one or more identification devices associated with said user-operable keys, and wherein said one or more identification devices are operable to selectively communicate with a digital apparatus placed in proximity of the keyboard in response to user-actuation of one or more of said user-operable keys, said keyboard comprising a flexible substrate for enabling said keyboard to be folded and/or rolled into a non-deployed inactive state, and unfolded and/or unrolled into a deployed active state for communicating with said digital apparatus, wherein:
    (a) said keyboard is operable to communicate with said digital apparatus when in proximity thereto by way of near-field magnetic coupling and/or near-field electrostatic coupling;
    (b) said keyboard includes an intermediate resonant circuit for interfacing between said one or more identification devices and said digital apparatus, wherein said intermediate resonant circuit includes a component which is spatially disposed to overlay a first region onto said digital apparatus in use; and
    (c) said keyboard further includes a pixel display with an associated display driver for receiving in operation data from said digital apparatus via said intermediate resonant circuit for presenting visual information to a user of said keyboard when in operation.

20. A keyboard as claimed in claim 19, wherein said pixel display is implemented using organic printable electronic components which are operable to flex when the keyboard is manipulated between its inactive folded state and its active unfolded state.

21. A keyboard as claimed in claim 19 or 20, wherein said intermediate resonant circuit is operable to exhibit a Q-factor greater than unity for providing signal enhancement for enabling said one or more identification devices to be energized from power delivered through said intermediate resonant circuit thereto.

22. A keyboard as claimed in claim 21, wherein said Q-factor is in a range of 10 to 100.

23. A keyboard as claimed in claim 21, wherein said intermediate resonant circuit is only coupled for communicating alternating signals induced therein to said one or more identification devices and to said digital apparatus.

24. A keyboard as claimed in claim 21, wherein said intermediate resonant circuit is operable in operation to exhibit a resonant frequency of substantially 13.56 MHz.

25. A keyboard as claimed in claim 20, said keyboard including a source of power therein, said source of power being coupled in operation to energize said one or more identification devices in an event that insufficient power is couplable from said digital apparatus via said intermediate resonant circuit to energize said one or more identification devices.

26. A keyboard as claimed in claim 19 or 20, wherein said substrate comprises a plurality of layers bonded, laminated and/or molded together.

27. A keyboard as claimed in claim 26, wherein said plurality of layers are bonded, laminated and/or molded together in roll-good form during manufacture of the keyboard.

28. A keyboard as claimed in claim 19 or 20, wherein said plurality of layers includes at least one of: polymeric insulating layers, electrically conductive layers, printed electronic polymer layers, surface mounted electronic chip components, surface mounted passive components.

29. A keyboard as claimed in claim 19 or 20, wherein said first region is smaller in area than said second region.

30. A keyboard as claimed in claim 19 or 20 wherein said first region is arranged to have an area corresponding substantially to an area provided on said keyboard for receiving said digital apparatus in operation.

31. A keyboard as claimed in claim 19 or 20, wherein at least one of said one or more identification devices is operable to multiplex a plurality of keys of the keyboard for monitoring user-actuation thereof during operation of the keyboard.

32. A keyboard as claimed in claim 19 or 20, wherein said first region is disposed substantially centrally in said keyboard when deployed in its active unfolded state.

33. A keyboard as claimed in claim 19 or 20, wherein said first region is disposed substantially asymmetrically towards a peripheral edge of said keyboard when deployed in its active unfolded state.

34. A keyboard as claimed in claim 19 or 20, wherein said keyboard has its keys selectively spatially disposed to assist with one or more of: alpha-numerical data entry to said digital apparatus, playing games executed in communication with said digital apparatus.

35. A method of coupling a keyboard including a plurality of user-operable alpha-numeric keys in communication with a digital apparatus placed in proximity of said the keyboard, said keyboard including one or more identification devices associated with said user-operable keys, said one or more identification devices being operable to selectively communicate with said digital apparatus in response to user-actuation of one or more of said user operable keys, wherein said method includes steps of:
(a) manufacturing said keyboard to comprise a flexible substrate for enabling said keyboard to be folded and/or rolled into a non-deployed inactive state, and unfolded and/or unrolled into a deployed active state for communicating with said digital apparatus;
(b) communicating from said keyboard with said digital apparatus when in proximity thereto by way of near-field magnetic coupling and/or near-field electrostatic coupling; and
(c) utilizing in said keyboard an intermediate resonant circuit for interfacing between said one or more identification devices and said digital apparatus, wherein said resonant circuit includes a component which is spatially disposed to overlay a first region onto said digital apparatus in use; and
(d) receiving in operation data from said digital apparatus via said intermediate resonant circuit for presenting visual information via a display driver coupled to an associated pixel display of said keyboard to a user of said keyboard.

36. A method as claimed in claim 35, wherein said intermediate resonant circuit is operable to exhibit a Q-factor greater than unity for providing signal enhancement for enabling said one or more identification devices to be energized from power delivered through said intermediate resonant circuit thereto.

37. A software product stored and/or conveyed on a data carrier, said software product being executable on computing hardware of a digital apparatus for use in implementing a method as claimed in claim 35.

38. A keyboard as claimed in claim 1, wherein said intermediate resonant circuit is operable to exhibit a Q-factor greater than unity for providing signal enhancement for enabling said one or more identification devices to be energized from power delivered through said intermediate resonant circuit thereto.

39. A method as claimed in claim 17, wherein said intermediate resonant circuit is operable to exhibit a Q-factor greater than unity for providing signal enhancement for enabling said one or more identification devices to be energized from power delivered through said intermediate resonant circuit thereto.

* * * * *